United States Patent
Zhang et al.

(10) Patent No.: US 12,072,451 B2
(45) Date of Patent: Aug. 27, 2024

(54) METHODS FOR DETECTING LIDAR APERTURE FOULING

(71) Applicant: Waymo LLC, Mountain View, CA (US)

(72) Inventors: Jingyuan Linda Zhang, Menlo Park, CA (US); Caner Onal, Palo Alto, CA (US)

(73) Assignee: Waymo LLC, Mountain View, CA (US)

(*) Notice: Subject to any disclaimer, the term of this patent is extended or adjusted under 35 U.S.C. 154(b) by 318 days.

(21) Appl. No.: 17/455,239

(22) Filed: Nov. 17, 2021

(65) Prior Publication Data

US 2023/0152431 A1    May 18, 2023

(51) Int. Cl.
   *G01S 7/497*      (2006.01)
   *B60S 1/56*       (2006.01)
   *G01S 17/931*     (2020.01)

(52) U.S. Cl.
   CPC ............... *G01S 7/497* (2013.01); *B60S 1/56* (2013.01); *G01S 17/931* (2020.01); *G01S 2007/4977* (2013.01)

(58) Field of Classification Search
   CPC ........... G01S 17/931; G01S 2007/4977; G01S 7/4813; G01S 13/931; G01S 7/497;
   (Continued)

(56) References Cited

U.S. PATENT DOCUMENTS 10,466,342 B1    11/2019  Zhu et al.
10,604,120 B2 *   3/2020  Newman ............ G02B 27/0006
(Continued)

FOREIGN PATENT DOCUMENTS

CN      113567961 A   * 10/2021
EP      3605137         2/2020
(Continued)

OTHER PUBLICATIONS

Diehm et al., "Mitigation of crosstalk effects in multi-LiDAR configurations," Electro-Optical Remote Sensing XII, Proceedings of the International Society for Optics and Photonics (SPIE), 2018, 12 pages.
(Continued)

*Primary Examiner* — Michael P Stafira
(74) *Attorney, Agent, or Firm* — McDonnell Boehnen Hulbert & Berghoff LLP

(57) ABSTRACT

An example method includes receiving point cloud information about a field of view of a lidar system. The point cloud information includes spatiotemporal and amplitude information about return light received. The method also includes determining, based on the point cloud information, a set of bright light returns from at least one highly reflective object. The bright light returns include return light having an amplitude above a photon threshold and a corresponding bright light return range. The method yet further includes determining, based on the point cloud information, a set of crosstalk returns. The crosstalk returns include return light having a corresponding crosstalk return range. The method includes adjusting, based on a normalized number of crosstalk returns, at least one of: a cleaning system, an operating mode of a lidar system, or an operating mode of a vehicle.

20 Claims, 18 Drawing Sheets

(58) Field of Classification Search
CPC ............. G01S 2007/4975; G01S 17/89; G01S 2013/9316; G01S 2013/9318; G01S 7/4039; G01S 2013/93273; G01S 7/4814; G01S 13/04; G01S 13/582; G01S 13/865; G01S 13/867; G01S 13/87; G01S 15/86; G01S 15/931; G01S 17/42; G01S 17/95; G01S 2007/52009; G01S 2013/93185; G01S 2013/9319; G01S 2013/9322; G01S 2013/93271; G01S 2013/93272; G01S 2013/93275; G01S 2015/938; G01S 7/003; G01S 7/02; G01S 7/2927; G01S 7/4091; G01S 7/412; G01S 7/415; G01S 7/4808; G01S 7/4811; G01S 13/88; G01S 13/951; G01S 17/02; G01S 17/08; G01S 17/93; G01S 17/933; G01S 2013/9323; G01S 2013/9324; G01S 2015/937; G01S 7/023; G01S 7/027; G01S 7/2883; G01S 7/40; G01S 7/4004; G01S 7/4043; G01S 7/4817; G01S 7/4815; G01S 7/4876; G01S 17/87; G01S 7/4816; G01S 17/10; G01S 7/4804; G01S 7/4865; G01S 7/4863; G01S 7/487; G01S 7/484; G01S 17/86; G01S 7/486; G01S 7/481; G01S 17/894; G01S 7/10; G01S 7/4812; G01S 7/483; G01S 17/88; G01S 7/4861; G01S 7/4912; G01S 17/06; G01S 7/4818; G01S 7/4914; B60S 1/56

See application file for complete search history.

(56) References Cited

U.S. PATENT DOCUMENTS

| | | |
|---|---|---|
| 10,802,121 B1 * | 10/2020 | Krishnan ............... G01S 17/931 |
| 10,830,880 B2 | 11/2020 | Subasingha et al. |
| 10,884,129 B2 | 1/2021 | Wu |
| 2010/0020306 A1 | 1/2010 | Hall |
| 2014/0060582 A1 | 3/2014 | Hartranft et al. |
| 2019/0094346 A1 | 3/2019 | Dumoulin et al. |
| 2019/0353761 A1 | 11/2019 | Kim et al. |
| 2020/0025896 A1 | 1/2020 | Gunnam |
| 2020/0025928 A1 | 1/2020 | Gaalema |
| 2020/0047717 A1 * | 2/2020 | Frederick ............ G02B 27/0006 |
| 2020/0064452 A1 * | 2/2020 | Avlas ...................... G01S 17/87 |
| 2020/0114907 A1 | 4/2020 | Sims, III et al. |
| 2020/0139939 A1 * | 5/2020 | Kubota ................. G01S 17/931 |
| 2020/0249329 A1 * | 8/2020 | Herman ................ G01S 17/931 |
| 2020/0249354 A1 * | 8/2020 | Yeruhami ............... G01S 17/06 |
| 2020/0408908 A1 | 12/2020 | Donovan |
| 2021/0080558 A1 | 3/2021 | Gosala et al. |
| 2021/0096228 A1 | 4/2021 | Behzadi et al. |
| 2021/0293929 A1 * | 9/2021 | Dong ...................... G01S 7/487 |

FOREIGN PATENT DOCUMENTS

| | | |
|---|---|---|
| JP | 2017067559 A | 4/2017 |
| WO | 2020186236 A1 | 9/2020 |
| WO | 2020/197613 | 10/2020 |

OTHER PUBLICATIONS

Montalban et al., "A Quantitative Analysis of Point Clouds from Automotive Lidars Exposed to Artificial Rain and Fog," Atmosphere, 2021, 25 pages, vol. 12, No. 738, https://doi.org/10.3390/atmos12060738.

Wallace et al., "Waveform LiDAR for Adverse Weather Conditions," IEEE Transactions on Vehicular Technology, 2020, 15 pages.

PCT International Search Report and Written Opinion, Application No. PCT/US2022/079799, mailed Mar. 15, 2023, 10 pages.

* cited by examiner

METHODS FOR DETECTING LIDAR APERTURE FOULING

BACKGROUND

Light detection and ranging (lidar) systems may be used to determine ranges to objects in an environment. Such range information can be aggregated into a dynamic "point cloud" that can be used for object detection, object avoidance, and/or navigation, for example. In an example application, lidar systems may be utilized by an autonomous vehicle to identify objects, such other vehicles, roadways, signs, pedestrians, buildings, etc.

Conventional lidar systems can be adversely affected when various components of the systems become fouled. For example, such fouling could include accumulation of dust, soil, oil, and/or precipitation on one or more optical surfaces (e.g., lenses and/or optical windows). In such scenarios, fouled optical surfaces may render the lidar systems ineffective and/or cause the lidar systems to provide incorrect or inaccurate information about the environment. Accordingly, improved systems and methods that may help mitigate optical fouling in lidar systems are desired.

SUMMARY

The present disclosure relates to lidar systems and methods of their use that may be configured to receive range and amplitude information about objects in the environment. Such range information could be used to form a point cloud. The amplitude information could be used to determine crosstalk light returns. A normalized number of crosstalk light returns could subsequently be utilized to determine a level of soiling of an optical window of the lidar system. In some examples, such embodiments could include lidar systems configured to be utilized with self-driving vehicles.

In a first aspect, a light detection and ranging (lidar) system is provided. The lidar system includes at least one light-emitter device configured to emit light pulses into a field of view of the environment and at least one detector. The lidar system also includes a controller having at least one processor and a memory. The at least one processor executes instructions stored in the memory so as to perform operations. The operations include causing the at least one light-emitter device to emit at least one light pulse into the field of view. The operations also include receiving, from the at least one detector, information indicative of return light associated with the field of view. The operations yet further include determining, based on the received information, at least one bright light return associated with at least one highly reflective object and a corresponding bright light return range.

In a second aspect, a method is provided. The method includes receiving information indicative of return light associated with a field of view of an environment. The method also includes determining, from the received information, at least one bright light return associated with at least one highly reflective object and a corresponding bright light return range. The method additionally includes classifying a portion of the return light as crosstalk light, wherein the crosstalk light has a corresponding crosstalk return range. The crosstalk return range is within a range tolerance with respect to the bright light return range.

In a third aspect, a method is provided. The method includes receiving point cloud information about a field of view of a lidar system. The point cloud information includes spatiotemporal and amplitude information about return light received by the lidar system. The method yet further includes determining, based on the point cloud information, a set of bright light returns from at least one highly reflective object. The bright light returns include return light having an amplitude above a photon threshold and a corresponding bright light return range. The method also includes classifying a portion of the point cloud information as crosstalk light, wherein the crosstalk light has a corresponding crosstalk return range. The crosstalk return range is within a range tolerance with respect to the bright light return range. The method additionally includes determining an apparent size of the at least one highly reflective object. The method further includes determining, based on the apparent size of the at least one highly reflective object, a normalized number of crosstalk returns and adjusting, based on the normalized number of crosstalk returns, at least one of: a cleaning system, an operating mode of a lidar system, or an operating mode of a vehicle.

Other aspects, embodiments, and implementations will become apparent to those of ordinary skill in the art by reading the following detailed description, with reference where appropriate to the accompanying drawings.

DETAILED DESCRIPTION

Figure 1:
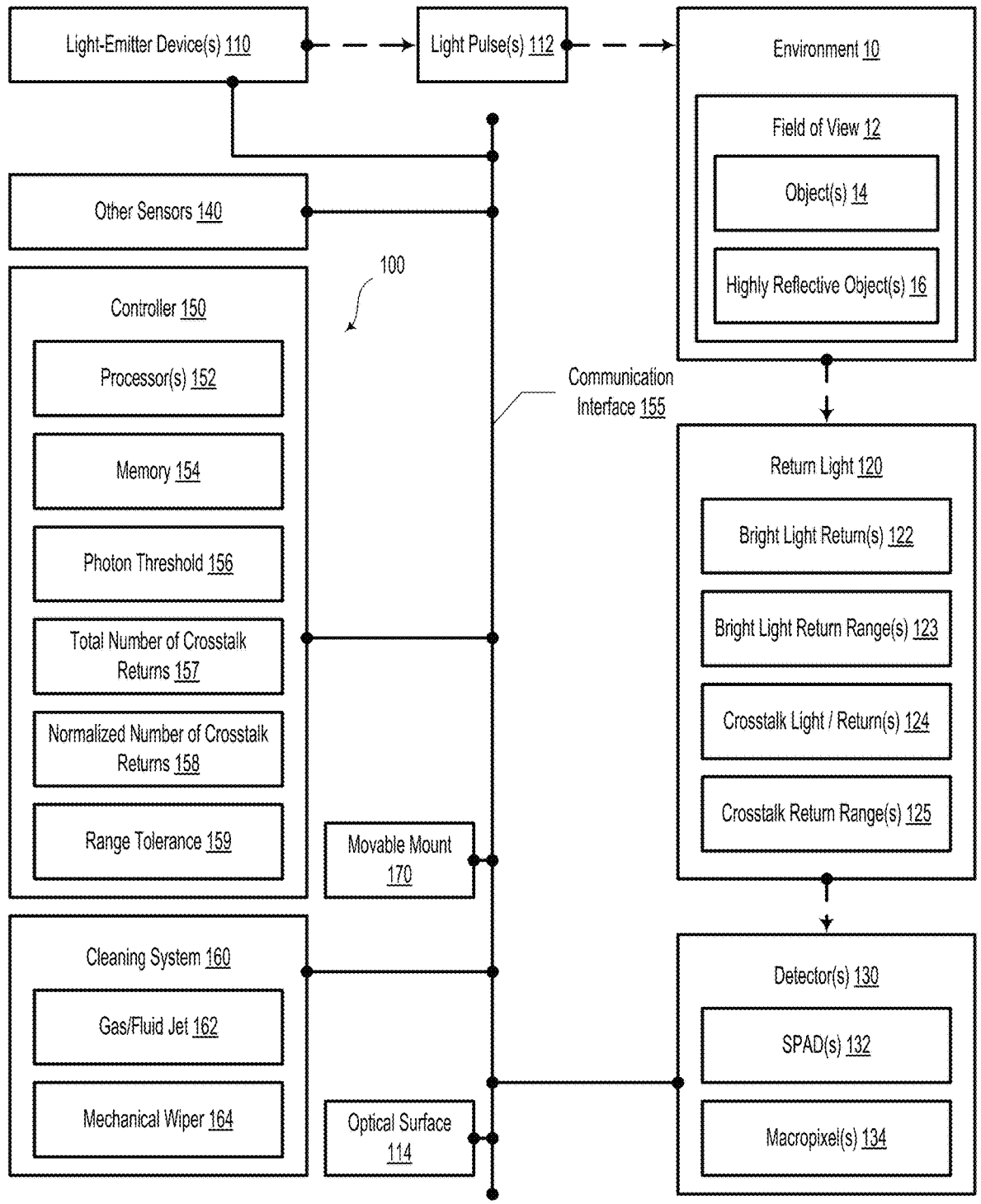
FIG. 1 illustrates a light detection and ranging (lidar) system, according to an example embodiment.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Point cloud data generated by lidar systems can include a rich set of information about the state of the lidar and the environment around the sensor. For example, crosstalk points in the point cloud data can be undesirable symptoms of aperture fouling and can also serve as a useful signal to trigger cleaning of an optical window or another component of the lidar system. In another example, operating the lidar system in foggy conditions can provide a "donut" of fog returns surrounding the lidar. In such scenarios, the amount of fog returns may inform about the degree of laser attenuation as it passes through the medium. In various examples, methods could be employed so as to adjust light pulse emission and/or detector properties so as to mitigate the effect of fog and/or other atmospheric conditions.

The present disclosure describes an approach to estimate lidar sensor performance in various weather and aperture fouling conditions based on point cloud data. Such an approach can complement existing sensor fusion and software techniques to estimate lidar sensor performance. In some examples, methods and systems described herein may complement sensors configured to detect weather and aperture fouling conditions ("crud sensors") and onboard and offboard weather data to detect various weather effects. That is, the present methods and systems may help fill gaps from other sensors and data sources. For example, while conventional crud sensors may be able to image smudges, rain drops, etc., they may not be able to detect sub-resolution-limit particles, which may correspond to 300 microns or smaller particle size at the aperture plane. In some examples, point cloud data may provide the additional advantage of accurately detecting small particles in various ways, including statistical measurement and analysis. Collectively, weather and aperture fouling conditions may contribute to optical fouling of the lidar sensor. It will be understood that other types of optical fouling are possible and may be detectable utilizing the systems and methods described in the present disclosure.

Present embodiments describe lidar systems and methods that may reduce or eliminate the negative effects of optical fouling. In some embodiments, optical fouling could include dust, soil, mud, or other organic or inorganic matter that may collect along an optical surface of the lidar system. Additionally or alternatively, optical fouling could include water droplets and/or condensation.

An example lidar system may include a plurality of light-emitter devices configured to emit pulses of laser light into an environment. As an example, an environment could include an interior or exterior environment, such as inside a building or outside of the building. Additionally or alternatively, the environment could include a vicinity around and/or on a roadway. Furthermore, the environment could include objects such as other vehicles, traffic signs, pedestrians, roadway surfaces, buildings, terrain, etc. Additionally light pulses could be emitted into a local environment of the lidar system itself. For example, the light pulses could interact with a housing of the lidar system and/or surfaces or structures coupled to the lidar system. In some cases, the lidar system could be mounted to a vehicle. In such scenarios, the lidar system could be configured to emit light pulses that interact with objects within a vicinity of the vehicle.

The lidar system may additionally include a firing circuit configured to selectively control the plurality of light-emitter devices to emit the light pulses in accordance with one or more adjustable light-emission parameters. The lidar system also includes a plurality of detectors configured to receive return light generated by interactions between the emitted laser light pulses and the environment.

Example embodiments may include systems and methods for calculating a representative number (e.g., a proxy or metric) that may scale with a degree of fouling of an optical window of a lidar. The lidar may emit light into the environment and a portion of light may be reflected back from objects in the environment as return light. In such scenarios, at least a portion of the return light can be classified as crosstalk light. The total number of crosstalk light returns can be normalized by an estimated area of one or more highly reflective objects in the environment. The normalized number of crosstalk light returns can be monitored continuously and/or periodically so as to estimate the amount of fouling of the optical window. The total number of crosstalk light returns could also be used to determine fouling/breakage of other optical components in the optical path (e.g., lens). If the normalized number of crosstalk light returns becomes larger than a predetermined threshold, a cleaning system could be triggered.

FIG. 1 illustrates a light detection and ranging (lidar) system 100, according to an example embodiment. In specific embodiments, the lidar system 100 could provide lidar functionality for a semi- or fully-autonomous vehicle. Such a vehicle can include motor vehicles (e.g., cars, trucks, buses, motorcycles, all-terrain vehicles, recreational vehicle, any specialized farming or construction vehicles, etc.), aircraft (e.g., planes, helicopters, drones, etc.), naval vehicles (e.g., ships, boats, yachts, submarines, etc.), or any other self-propelled vehicles (e.g., robots, factory or warehouse robotic vehicles, sidewalk delivery robotic vehicles, etc.) capable of being operated in a self-driving mode (without a human input or with a reduced human input) to navigate its environment 10. As described herein, the environment 10 could include an interior or exterior environment, such as inside a building or outside of the building. Additionally or alternatively, the environment 10 could include a vicinity around and/or on a roadway. Furthermore, the environment 10 could include objects such as other vehicles, traffic signs, pedestrians, roadway surfaces, buildings, terrain, etc. Additionally or alternatively, the environment 10 could include the interior of the semi- or fully-autonomous vehicle. In some embodiments, the lidar system 100 could be configured to obtain point cloud information that could include information indicative of a plurality of points in specific locations in three-dimensional space. As an example, the point cloud information could indicate the location of objects 12 in the environment 10.

The lidar system 100 includes at least one light-emitter device 110 configured to emit light pulses 112 into a field of view 12 of the environment 10. The light-emitter devices 110 could include one or more laser diodes (e.g., semiconductor laser bars), light-emitting diodes (LEDs), or other types of devices configured to emit light in discrete light pulses. In an example embodiment, the light pulses could be emitted in an adjustable and/or controllable manner. Optionally, the plurality of light-emitter devices 110 could include an array of vertical-cavity surface-emitting lasers (VC-SELs). However, other types of light-emitter devices are possible and contemplated. In some embodiments, the light-emitter devices 110 could be configured to emit light with wavelength around 905 nm. It will be understood that other emission wavelengths are possible and contemplated.

The lidar system 100 includes at least one detector 130. In some embodiments, the detectors 130 could include a plurality of single photon avalanche detectors (SPADs) and/or silicon photomultiplier (SiPM) devices. Other types of image sensors and photodetector devices are possible and contemplated. In various embodiments, the plurality of detectors 130 could include an array of detector elements that form at least one macropixel. In some examples, a macropixel could include a plurality of detector elements that are physically adjacent and/or associated with one another. In such scenarios, a macropixel could form a large area detector compared to the area of an individual detector element. Systems and methods could relate to examples including a single light-emitter device (e.g., 1 transmitter or 1 Tx) that can be utilized with N detectors (or macropixels) (e.g., N receivers or N Rx). However, it will be understood that disclosed systems and methods could include N Tx to N Rx (e.g., each Tx channel corresponds to an Rx channel) or N Tx to M Rx, where M is greater than N. Other configurations and arrangements of Tx and Rx elements are contemplated and possible.

The lidar system 100 also includes a controller 150. In an example embodiment, the controller 150 includes at least one processor 152 and a memory 154. In some embodiments, the controller 150 could include an application specific integrated circuit (ASIC), a field-programmable gate array (FPGA), a microprocessor, and/or a graphics processing unit (GPU). Other types of circuits and computing devices are possible and contemplated. The at least one processor 152 executes instructions stored in the memory 154 so as to perform operations. The operations include causing the at least one light-emitter device 110 to emit at least one light pulse 112 into the field of view 12.

The operations include receiving, from the at least one detector 130, information indicative of return light 120 associated with the field of view 12. It will be understood that the light pulses 112 may interact differently with various objects 14 in the environment 10 depending on, for example, various characteristics of the objects 14, including surface characteristics (e.g., smooth or rough), color, shape, orientation, size, among other factors. Some of the objects 14 could be considered highly reflective objects 16. Highly reflective objects 16 could include, without limitation, smooth mirror-like surfaces, glass, polished metal, corner cubes, among other possibilities. In such scenarios, the highly reflective objects 16 may reflect/refract light back towards the lidar system 100 in a very efficient manner (e.g., over 30%, over 50%, over 70%, or even over 90% of the emitted photons could be reflected back towards the lidar system 100). Such highly reflective objects may be termed retroreflectors.

The operations also include determining, based on the received information, at least one bright light return 122 associated with at least one highly reflective object 16 and a corresponding bright light return range 123. The bright light return 122 could be determined based on an intensity of the return light 120 being above a photon threshold 156. The corresponding bright light return range 123 could be determined based on a time of flight of the light pulse. In such scenarios, the time of flight of the light pulse may provide a distance measurement between the light-emitter device 110 and the highly reflective object 16. For example, the distance d between the light-emitter device 110 and the highly reflective object 16 is equal to the speed of light c multiplied by time of flight t over two.

$$d = \frac{c \cdot t}{2}$$

In some examples, the bright light return range 123 could include a distance of between 0.1 meter to 200 meters from the lidar system 100.

In some embodiments, the photon threshold 156 could be stored in the memory 154 (e.g., in a database or look-up table). Additionally or alternatively, the photon threshold 156 could be a static value, a set of static values, and/or a dynamic value or set of dynamic values. In some examples, the photon threshold 156 could be determined dynamically and/or continuously based on the intensity of return light 120. In such a scenario, the photon threshold 156 could be reduced in low-light background conditions (e.g., at night, inside a tunnel, etc.) and could be increased in bright light background conditions (e.g., during the day, sunny conditions, high glare conditions, etc.). In other examples, the photon threshold 156 could vary based on the return range of the received return light 120. For example, the photon threshold 156 could decrease as a function of return range to reflect the generally lower intensity of longer range returns. In such a scenario, the photon threshold 156 could be higher at close return ranges (e.g., ranges less than 50 meters or less) and lower at distant return ranges (e.g., ranges greater than 50 meters or more).

The operations yet further include determining a total number of crosstalk returns 157. Each crosstalk return 124 of the total number of crosstalk returns 157 includes return light 120 having a corresponding crosstalk return range 125. The crosstalk return range 125 is within a range tolerance 159 with respect to the bright light return range 123. In some examples, a higher number of bright light returns 122 that fall within the range tolerance 159 could indicate the presence of a highly reflective/retroreflector object 16. In other words, a subset of the bright light returns 122 could be classified as crosstalk returns 124 if their respective return ranges fall within the range tolerance 159. In some examples, the operations may further include determining an approximate area of the highly reflective object 16. In such scenarios, an area of the highly reflective object 16 (e.g., in square meters or square centimeters) could be determined based on the corresponding detectors 130 and/or macropixels 134 that receive photons that have similar return ranges.

In some examples, the range tolerance 159 could be within 50 centimeters of the bright light return range 123. Additionally or alternatively, in some embodiments, the range tolerance 159 could be between −30 centimeters and +50 centimeters with respect to the bright light return range 123. It will be understood that other range tolerances are possible and contemplated.

In some examples, the overall number of crosstalk returns 158 could vary based on a level of soiling of the optical surface 114. In some embodiments, soiling could include accumulation of dirt, oil, organic particles, water, or other particulates on the optical surface 114 (e.g., a lens or optical window) of the lidar system 100. That is, in some examples, the number of crosstalk returns 158 could increase due to dust, dirt, or other particles (organic or inorganic) collecting on the optical surface 114.

The operations additionally include determining a normalized number of crosstalk returns 158 based on an apparent size of the at least one highly reflective object 16 in the field of view 12. The apparent size of the highly reflective object 16 could be determined by various methods including, but not limited to, object recognition in a captured camera image, radar data, or lidar data. In some examples, determining the normalized number of crosstalk returns 158 could include dividing the total (absolute) number of crosstalk returns 157 by the approximate area of the highly reflective object 16. In such scenarios, the normalized number of crosstalk returns 158 could be indicated in units of photons per square centimeter or another type of photons per unit area measurement.

The lidar system 100 also includes at least one optical surface 114 and a cleaning system 160. In such scenarios, the operations may additionally include causing, based on the normalized number of crosstalk returns 158, the cleaning system 160 to clean the at least one optical surface 114. As an example, if the normalized number of crosstalk returns 158 is above a normalized crosstalk return threshold, it may indicate that the at least one optical surface 114 is dirty, cracked, or otherwise fouled.

In some examples, the at least one optical surface 114 could include an optical window, an optical lens, or a reflective surface. In some embodiments, the optical surface 114 could include an outer window of a housing of the lidar system 100. Other types of optical surfaces are possible and contemplated. In some examples, the optical surface 114 could accumulate dust, dirt/mud, bug splatter, or other organic or inorganic debris due to, for example, being exposed to outdoor driving conditions and environments. Such accumulation on the optical surface 114 can be partially or fully responsible for optical fouling.

Additionally or alternatively, the cleaning system 160 could include at least one of: a compressed gas jet, a fluid jet, or a mechanical wiper. In such scenarios, a mechanical wiper could be configured to physically wipe the optical surface 114 (e.g., the outer window of the lidar system 100), like a windshield wiper. In example embodiments, the compressed gas jet or fluid jet could be configured to blow or physically remove debris from the optical surface 114.

In various examples, the lidar system 100 could include a movable mount 170 configured to adjustably control the field of view 12. In such scenarios, the operations may also include determining a normalized number of crosstalk returns 158 for each field of view 12 of a plurality of fields of view. In some examples, the plurality of fields of view could include a 360° field of view around a vehicle.

Figure 2:
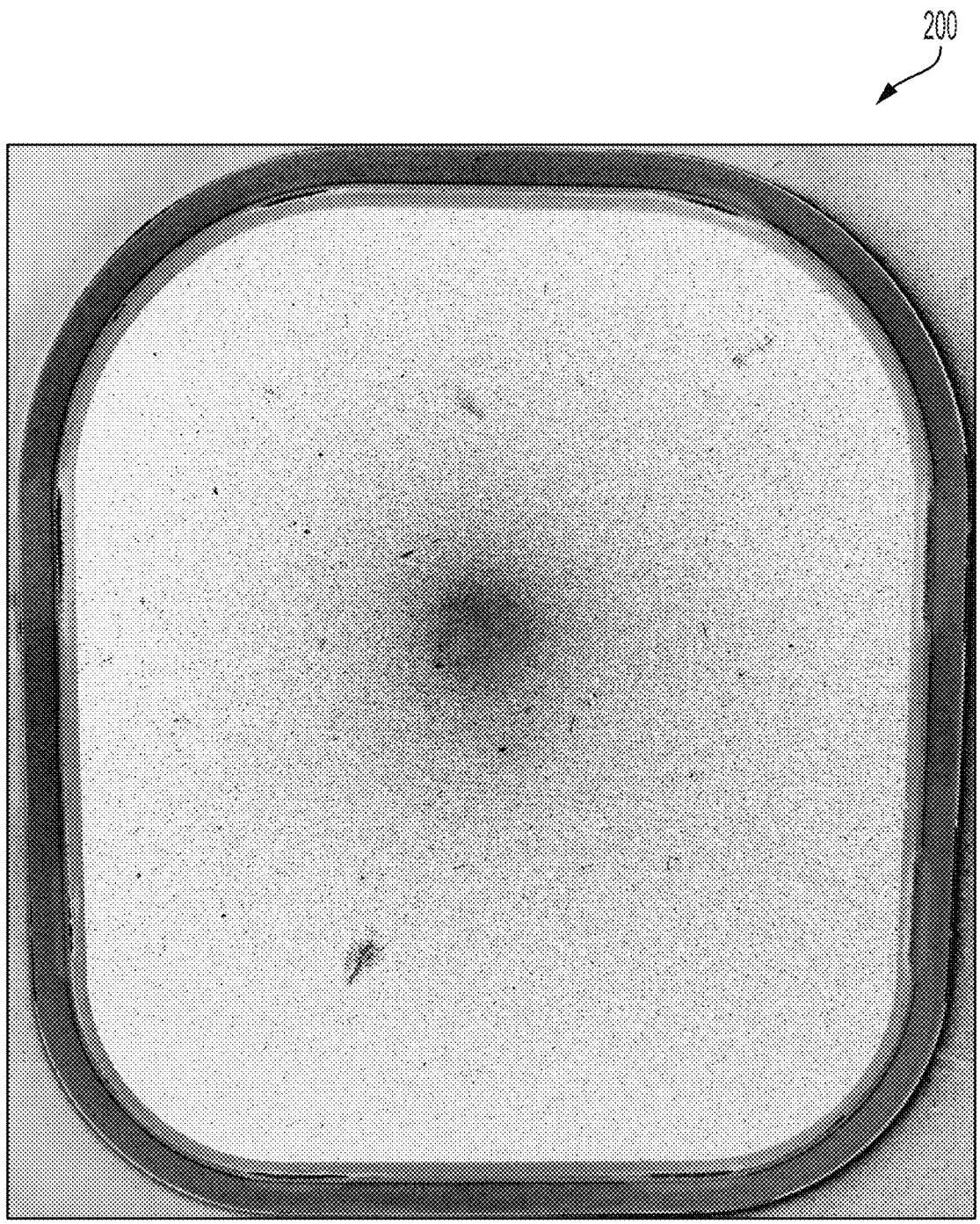
FIG. 2 illustrates an optical window, according to an example embodiment.

FIG. 2 illustrates an optical window 200, according to an example embodiment. Optical window 200 could represent the optical surface 114. As illustrated in FIG. 2, optical window 200 could include accumulated dust, dirt, bug splats, and other organic or inorganic particles, among other possibilities (e.g., water droplets of various sizes). This accumulated dust, etc. could contribute to optical scattering and/or crosstalk within the lidar system 100. As described above, the cleaning system 160 could be configured to clean an outer surface of the optical window 200 to reduce or eliminate the optical effects of the accumulated dust, etc.

Figure 3:
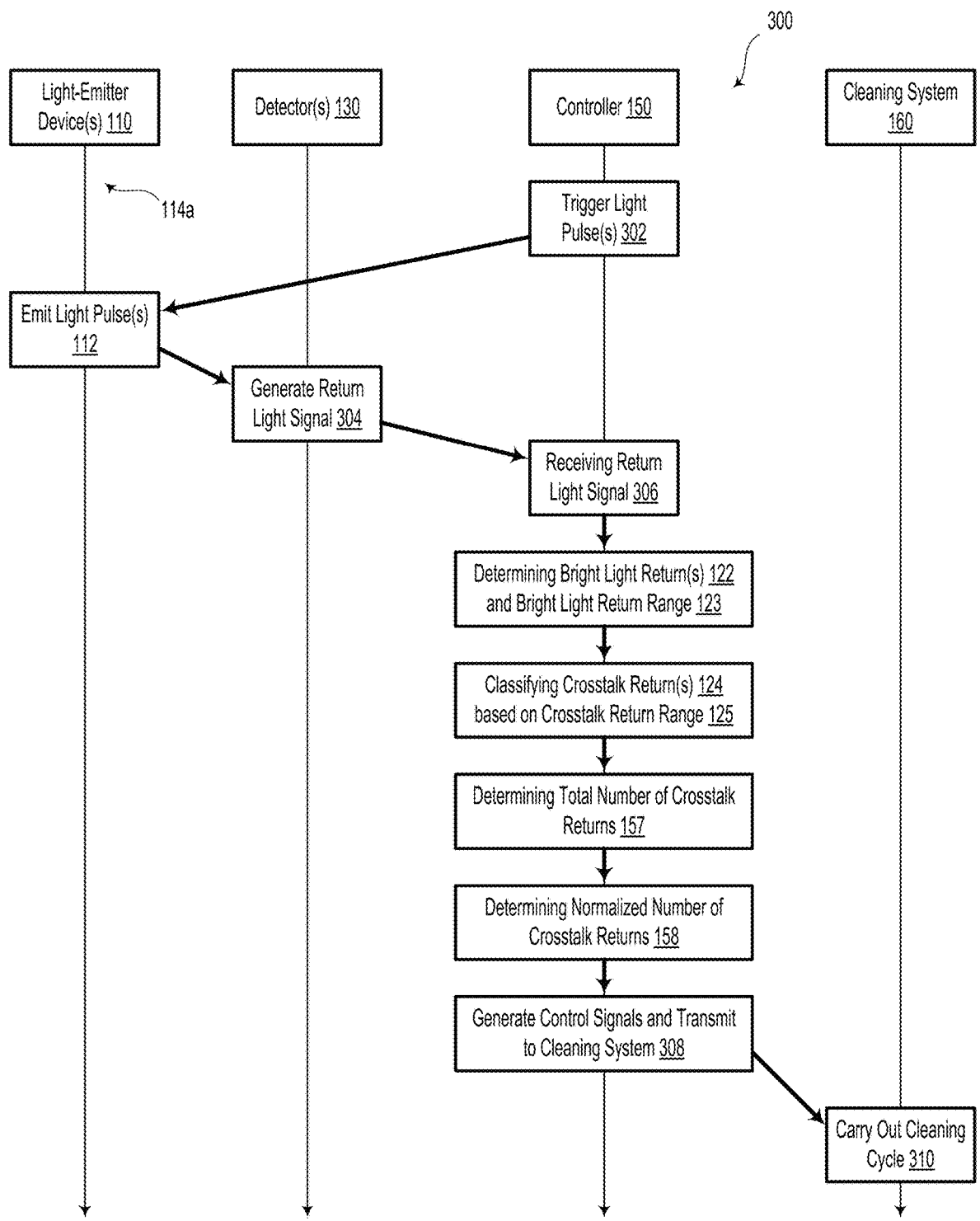
FIG. 3 illustrates a swimlane diagram, according to an example embodiment.

FIG. 3 illustrates a swimlane diagram 300, according to an example embodiment. The swimlane diagram 300 indicates a possible order of operations among several elements of the system 100 including the light-emitter devices 110, the detectors 130, the controller 150, and the cleaning system 160. For example, the controller 150 could carry out block 302 to trigger light pulses. In such a scenario, the controller 150 could transmit a trigger signal to the light-emitter devices 110 and/or a corresponding driver circuit. In response, the light-emitter devices 110 could emit light pulses 112 into a field of view 12 in the environment 10. The light pulses 112 could interact with objects 14 in the field of view 12 to create return light 120.

At least a portion of the return light 120 could cause the detectors 130 to carry out block 304—generating a return light signal. In such scenarios, the controller 150 could be configured to carry out block 306—receiving the return light signal.

In various examples, the controller 150 could determine a number of bright light returns 122 and corresponding bright light return range 123. In some examples, some of the objects 14 could include highly reflective objects 16 that could reflect the light pulses 112 back toward the lidar system 100 in an efficient manner. In such scenarios, the number of bright light returns 122 could be based on the portion of return light 120 detected by the detectors 130 being greater than the photon threshold 156.

As illustrated in FIG. 3, the controller 150 could also be configured to classify a portion of the return light 120 as crosstalk returns 124. For example, the portion of return light 120 that has a corresponding return range similar to that of the bright light return range 123 could be classified as crosstalk light returns 124. Furthermore, the controller 150 could determine a total number of crosstalk returns 157 based on the classified crosstalk light returns 124. In some examples, determining the total number of crosstalk returns 157 could be determined based on that portion of return light 120 that has a corresponding return range within the range tolerance 159 of the bright light return range 123. In other scenarios, determining the total number of crosstalk returns 157 could additionally or alternatively be based on a determining the portion of return light 120 arriving from a similar spatial location or angle as that of the bright light returns 122.

In some examples, other characteristics of the return light 120 could be additionally or alternatively utilized to classify a portion of the return light as crosstalk returns 157. For example, a portion of the return light 120 could be classified as crosstalk returns 157 based on having an intensity within a predetermined intensity range, below a predetermined intensity threshold, or above a predetermined intensity threshold. Additionally or alternatively, a portion of the return light 120 could be classified as crosstalk returns 157 based on a characteristic intensity falloff (e.g., drop in intensity versus angle) from a bright "aggressor" target. It will be understood that other ways to classify crosstalk returns 157 are possible and contemplated.

Swimlane diagram 300 also includes the controller 150 determining the normalized number of crosstalk returns 158. In such scenarios, the controller 150 could determine the normalized number of crosstalk returns 158 by dividing the total number of crosstalk returns 157 by an area of the respective highly reflective objects 16. Other ways to normalize the total number of crosstalk returns 157 are possible and contemplated. For example, the total number of crosstalk returns 157 could be divided by a scanned area of the field of view.

The controller 150 could be configured to carry out block 308 to generate control signals and transmit the signals to the cleaning system (e.g., cleaning system 160). In such scenarios, the control signals could include information indicative of signals that may trigger a cleaning cycle or another type of operational adjustment of the cleaning system.

Swimlane diagram 300 could also include cleaning system 160 carrying out block 310. In such scenarios, block 310 could include carrying out a cleaning cycle. The cleaning cycle could include a wiper cleaning process, a compressed gas cleaning process, and/or a fluid jet cleaning process.

Figure 4A:
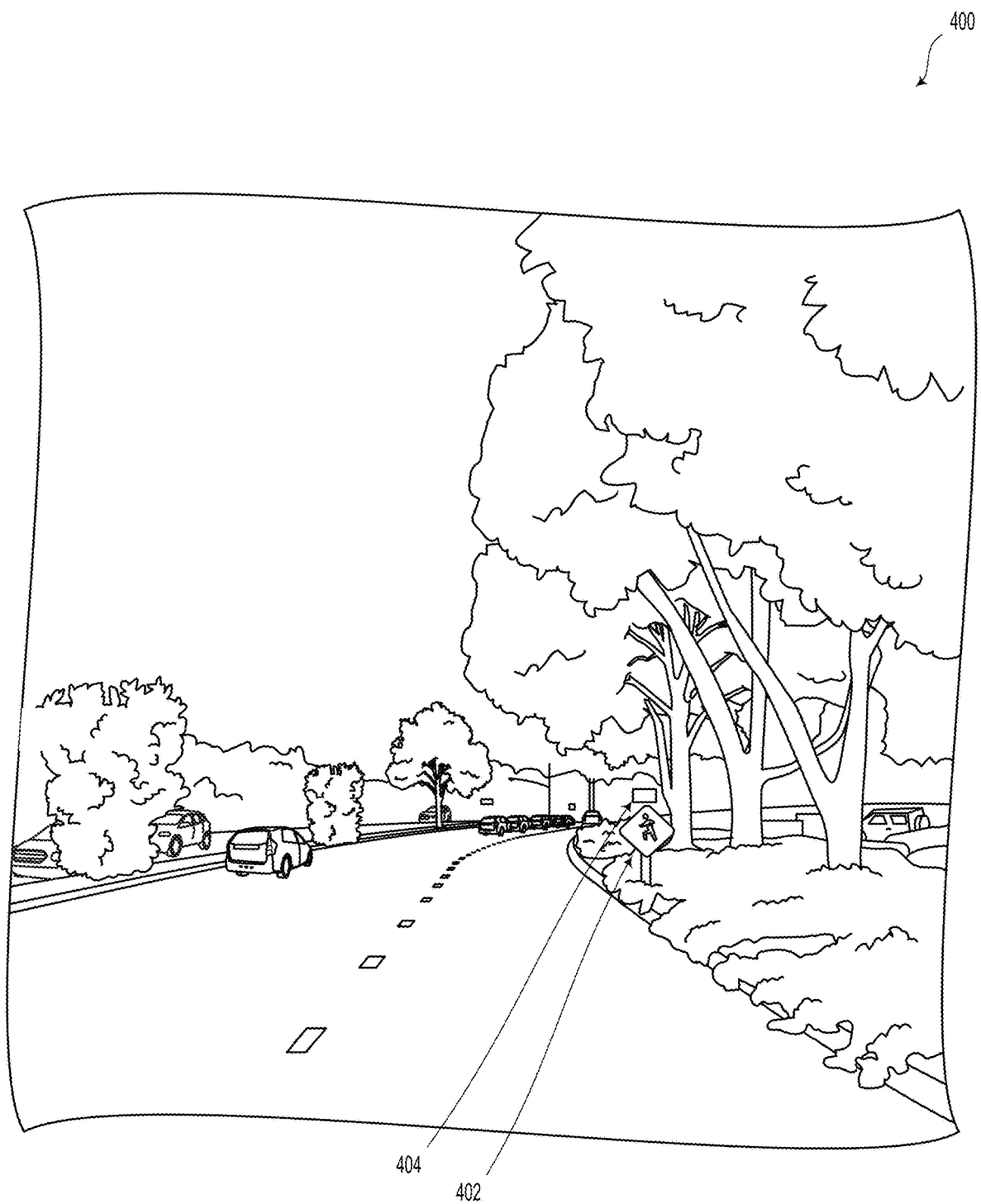
FIG. 4A illustrates an operating scenario, according to an example embodiment.

FIG. 4A illustrates an operating scenario 400, according to an example embodiment. Operating scenario 400 could include a vehicle driving scenario. Namely, the vehicle may be traveling in the right lane of a multiple lane road. In such a scenario, various objects such as trees, other vehicles, roadway markers, and reflective signs could be within a field of view of the vehicle. As illustrated in FIG. 4A, the reflective signs could include a pedestrian walkway sign 402 and a smaller sign 404.

Figure 4B:
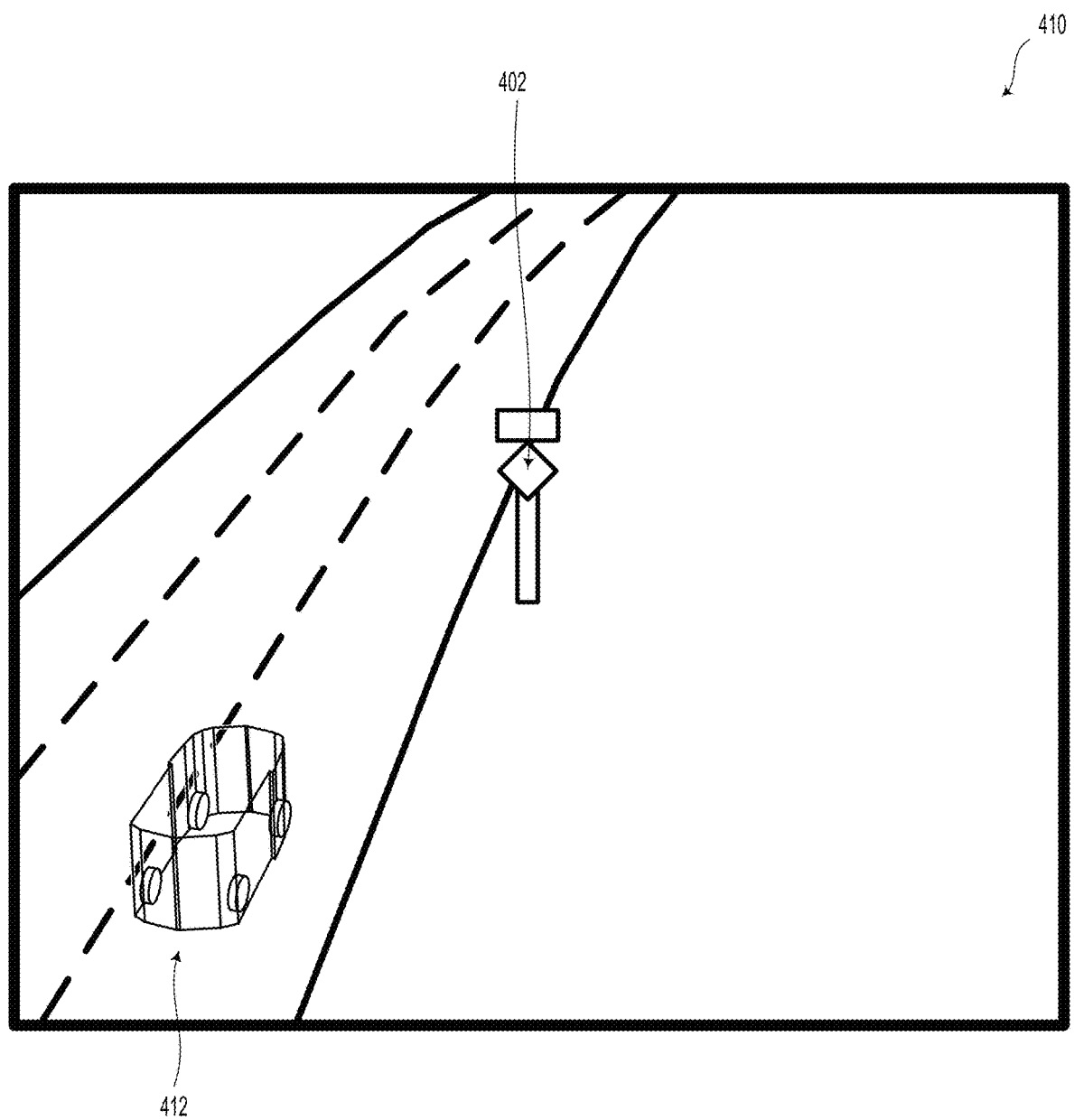
FIG. 4B illustrates an operating scenario, according to an example embodiment.

FIG. 4B illustrates an operating scenario 410, according to an example embodiment. The operating scenario 410 could include an overhead oblique angle image that may include overlaid lidar point cloud information. As an example, the pedestrian walkway sign 402 and the smaller sign 404 could be visible along the right side of the vehicle 412.

Figure 4C:
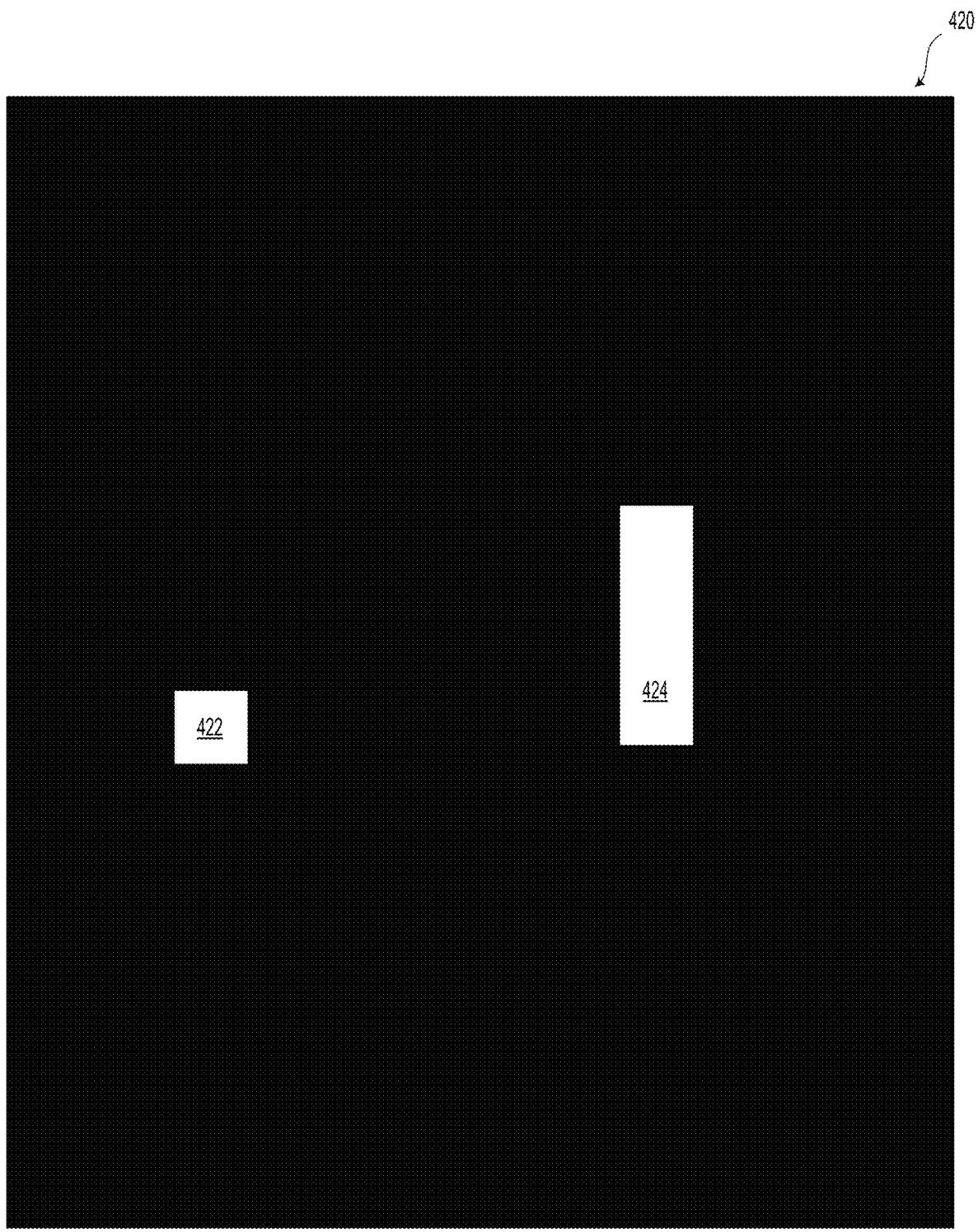
FIG. 4C illustrates an operating scenario, according to an example embodiment.

FIG. 4C illustrates an operating scenario 420, according to an example embodiment. Operating scenario 420 illustrates a grayscale return light image that includes two highly reflective objects 422 and 424. In some embodiments, highly reflective objects 422 and 424 could represent retroreflectors with different areas.

Figure 4D:
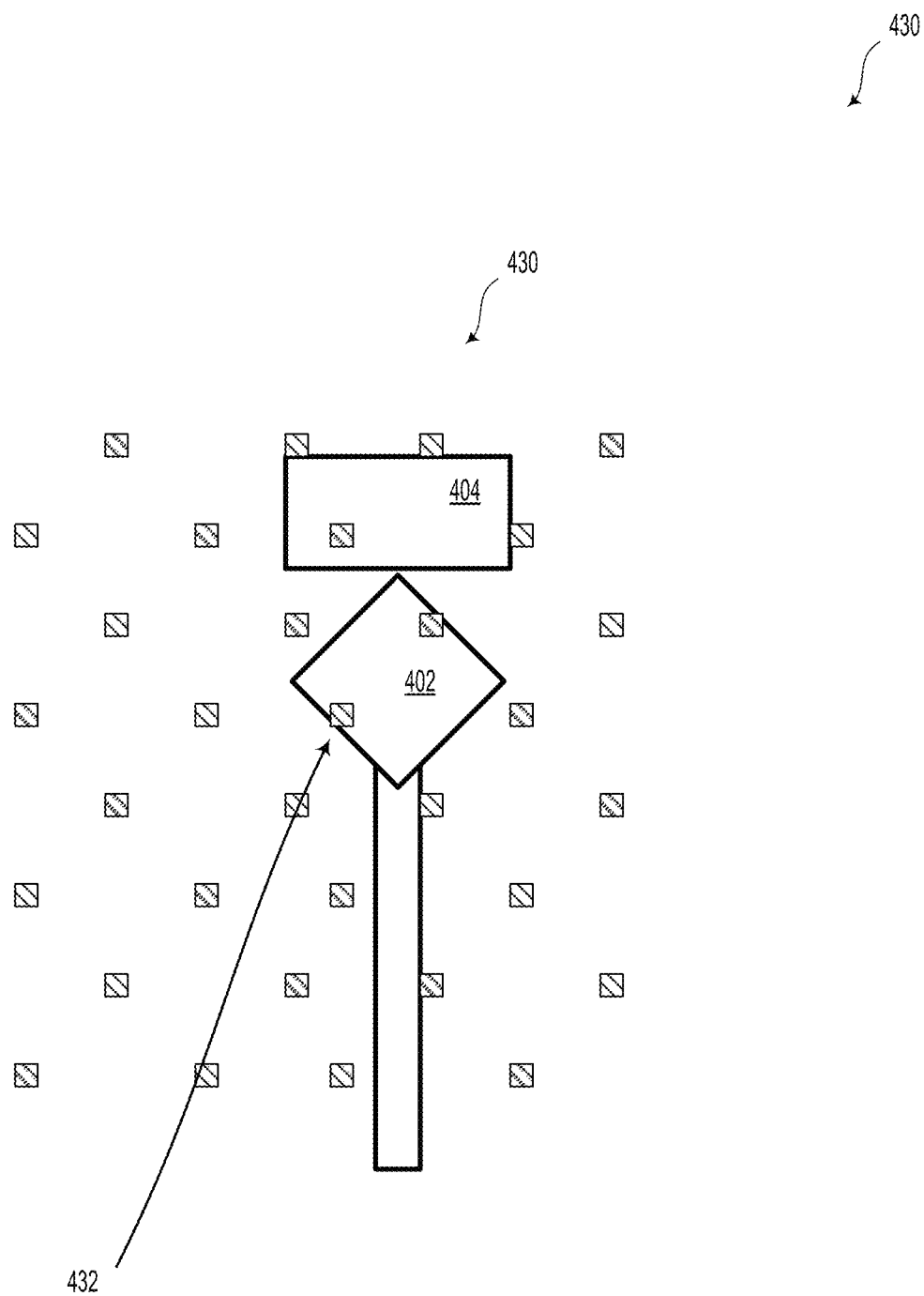
FIG. 4D illustrates an operating scenario, according to an example embodiment.

FIG. 4D illustrates an operating scenario 430, according to an example embodiment. Operating scenario 430 includes the pedestrian walkway sign 402 and the smaller sign 404. The array of cross-hatched squares represent a plurality of laser light pulses (e.g. light pulse 432) that may be emitted into a field of view 12 of the lidar system. In operating scenario 430, light pulse 432 may interact with the pedestrian walkway sign 402 and a relatively large portion of the photons may be reflected back toward the lidar system. In turn, the return light corresponding to light pulse 432 may be received primarily from a given photodetector channel configured to receive light from that region of the field of view and classified as a bright light return 122. In such a scenario, bright light returns from other channels that have a similar return range to bright light return 122 could be classified as crosstalk returns 124. That is, a portion of the photons from the bright light return 122 could be received at other detector channels as crosstalk due to optical scattering, stray light, ghosting, multi-path propagation, or other optical system imperfections. As an example, a first portion of the bright light return 122 could be directly transmitted (e.g., without substantial scattering or unintended refraction/reflection) via the optical system to a primary photodetector channel. A second portion of the bright light return 122 could be scattered, refracted, reflected or otherwise directed toward an adjacent photodetector channel. In such an example, the first and second portion of the bright light return 122 could be determined to be from the same (or substantially similar) range. Furthermore, the second portion of the bright light return 122 could be within a threshold optical intensity with respect to the first portion of the bright light return 122. In such scenarios, the second portion of the bright light return 122 could be determined to be crosstalk. It will be understood that the cross-hatched squares are meant to represent discrete lidar light pulses that might be emitted into the field of view 12 during a single emission period/cycle of the lidar. Subsequent emission periods will "fill in" the detected scene due to the spinning nature of the lidar system.

Figure 4E:
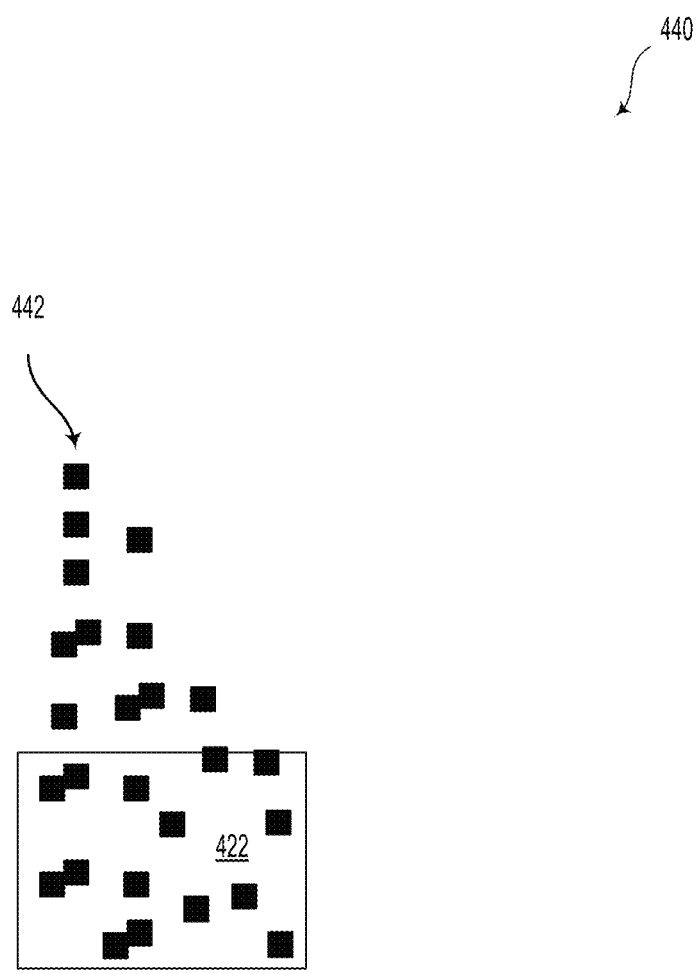
FIG. 4E illustrates an operating scenario, according to an example embodiment.

FIG. 4E illustrates an operating scenario 440, according to an example embodiment. Operating scenario 440 illustrates a highly reflective object 422 and corresponding plurality of crosstalk returns (e.g., dark square dots such as crosstalk return 442) that could be received from nearby detector channels due to optical scattering or other optical defects.

Figure 4F:
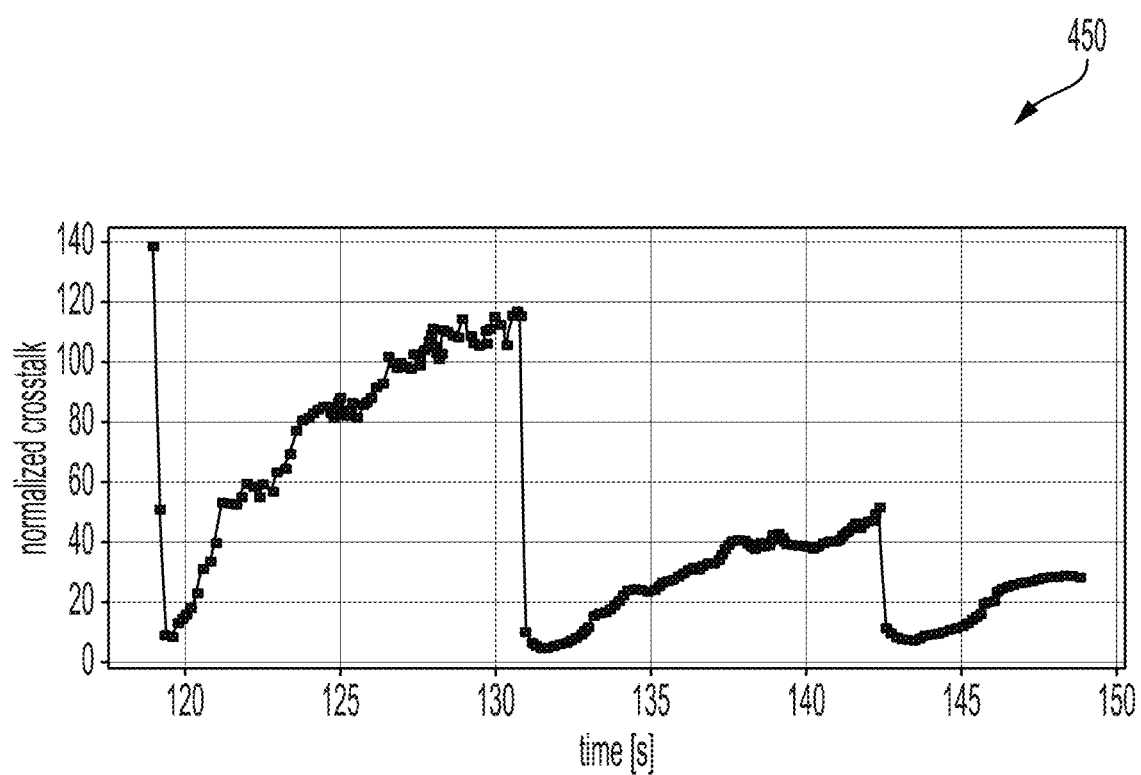
FIG. 4F illustrates a normalized number of crosstalk returns versus time, according to an example embodiment.

FIG. 4F illustrates a graph 450 providing a normalized number of crosstalk returns versus time, according to an example embodiment. In the illustrated scenario, water mist was continuously sprayed on an optical surface to simulate accumulation of rain on the lidar window. As illustrated in graph 450, the number of normalized crosstalk returns increases with time due to the increasing amount of light scattering that may result from water accumulating on the lidar window. Additionally, a periodic series of compressed air "puffs" were applied to the optical surface which removed at least some of the accumulated water and correspondingly reduced the number of normalized crosstalk returns. Although the airpuffing operations are shown over a periodic schedule, it will be understood that other schedules (aperiodic, on-demand, etc.) for airpuffing or other cleaning operations described herein are possible and contemplated.

Figure 4G:
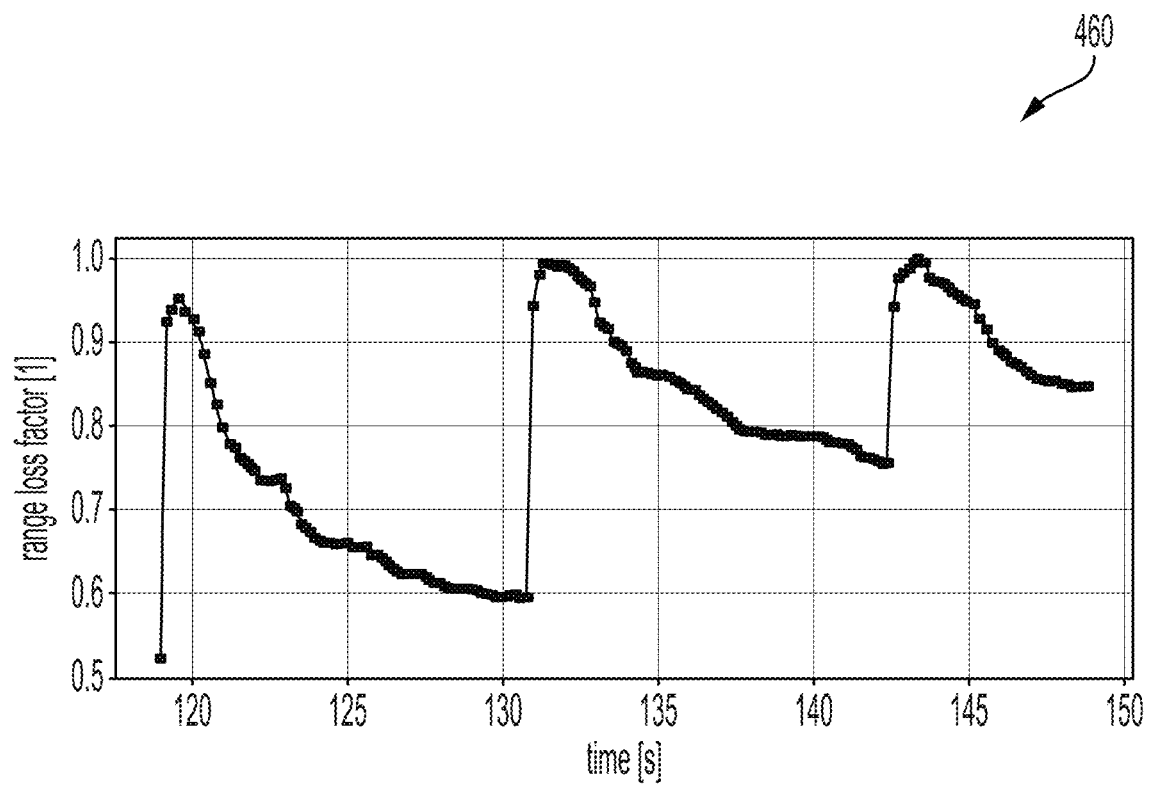
FIG. 4G illustrates a dark target range as a function of time, according to an example embodiment.

FIG. 4G illustrates a graph 460 providing a dark target range as a function of time, according to an example embodiment. In such a scenario, which is similar to that illustrated in FIG. 4F, water mist was continuously sprayed on an optical surface. The dark target range is the range at which objects can be effectively and reliably detected by a lidar system. In various examples, the dark target range of such lidar systems can vary between 60 to 200 meters or more. The dark target range can change based on an average number of photons per received return light pulse, a background light level, and/or an environment condition (e.g., rain, snow, fog, etc.). In graph 460, as water accumulates on the optical surface, the dark target range initially decreases to less than about 65 percent of the "clean" dark target range. The decreasing dark target range is due to the increasing amount of scattering and stray light due to the accumulation of water on the optical surface. Periodically, an airpuffing cleaning procedure is applied to remove the water on the optical surface, causing the dark target range to abruptly return to near 100% of the "clean" dark target range.

Figure 4H:
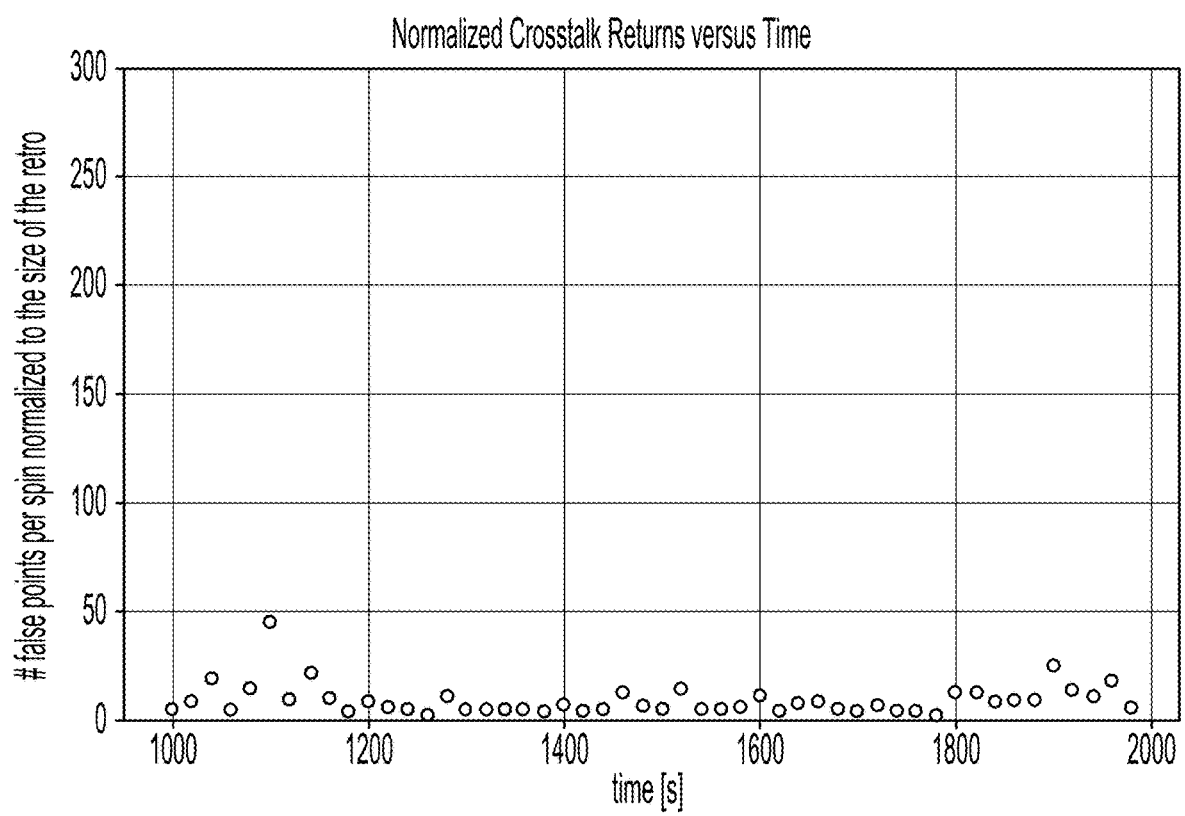
FIG. 4H illustrates a normalized number of crosstalk returns versus time, according to an example embodiment.

FIG. 4H illustrates a graph 470 representing a normalized number of crosstalk returns versus time, according to an example embodiment. The graph 470 illustrates the number of normalized crosstalk returns with a clean optical window.

Figure 4I:
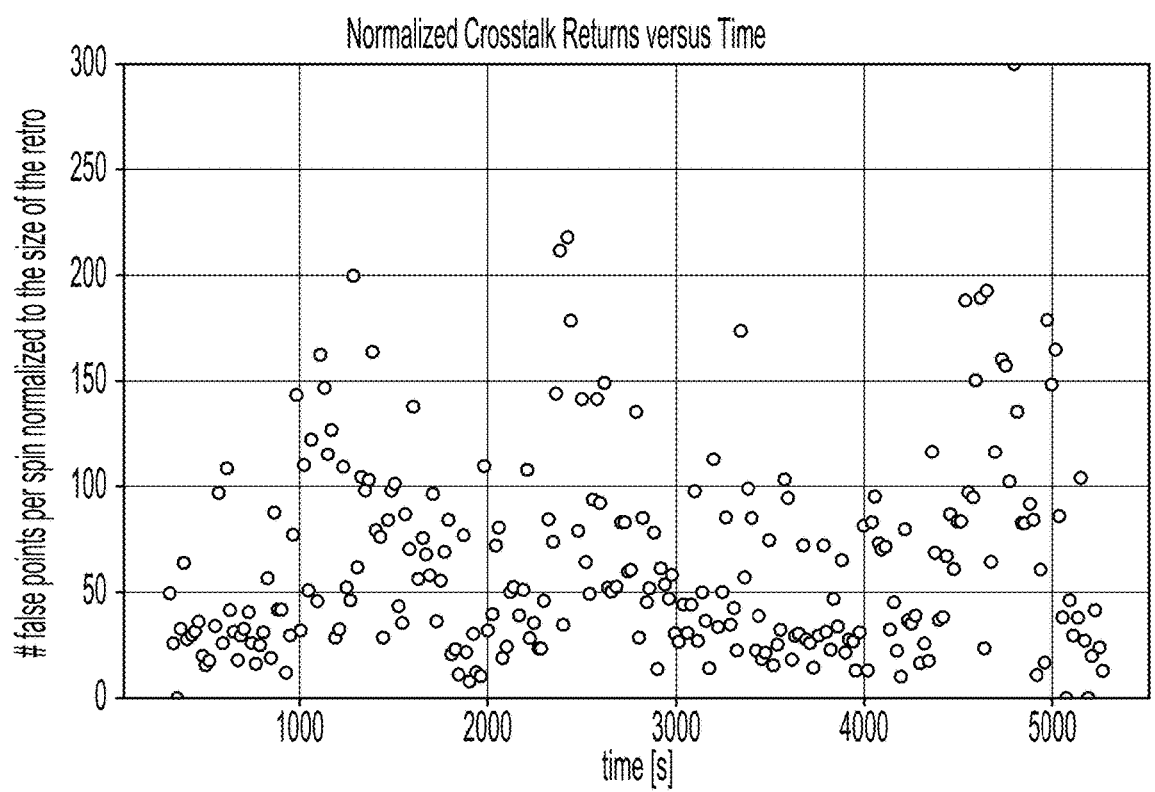
FIG. 4I illustrates a normalized number of crosstalk returns versus time, according to an example embodiment.
Figure 5A:
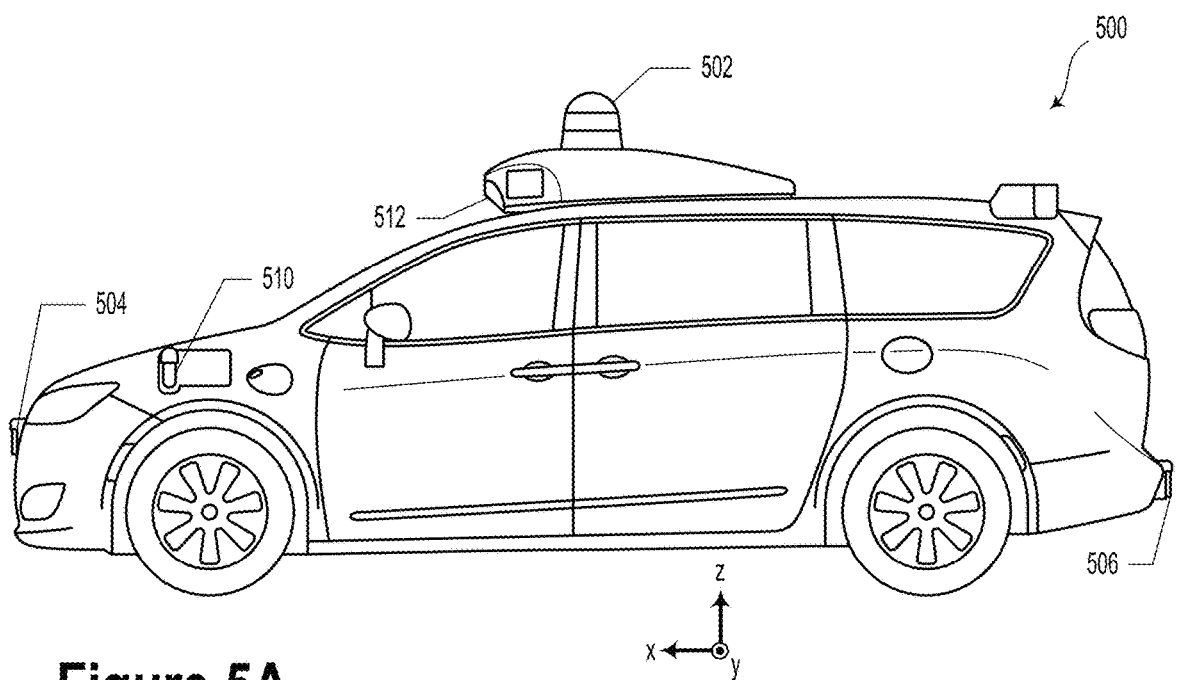
FIG. 5A illustrates a vehicle, according to an example embodiment.
Figure 5B:
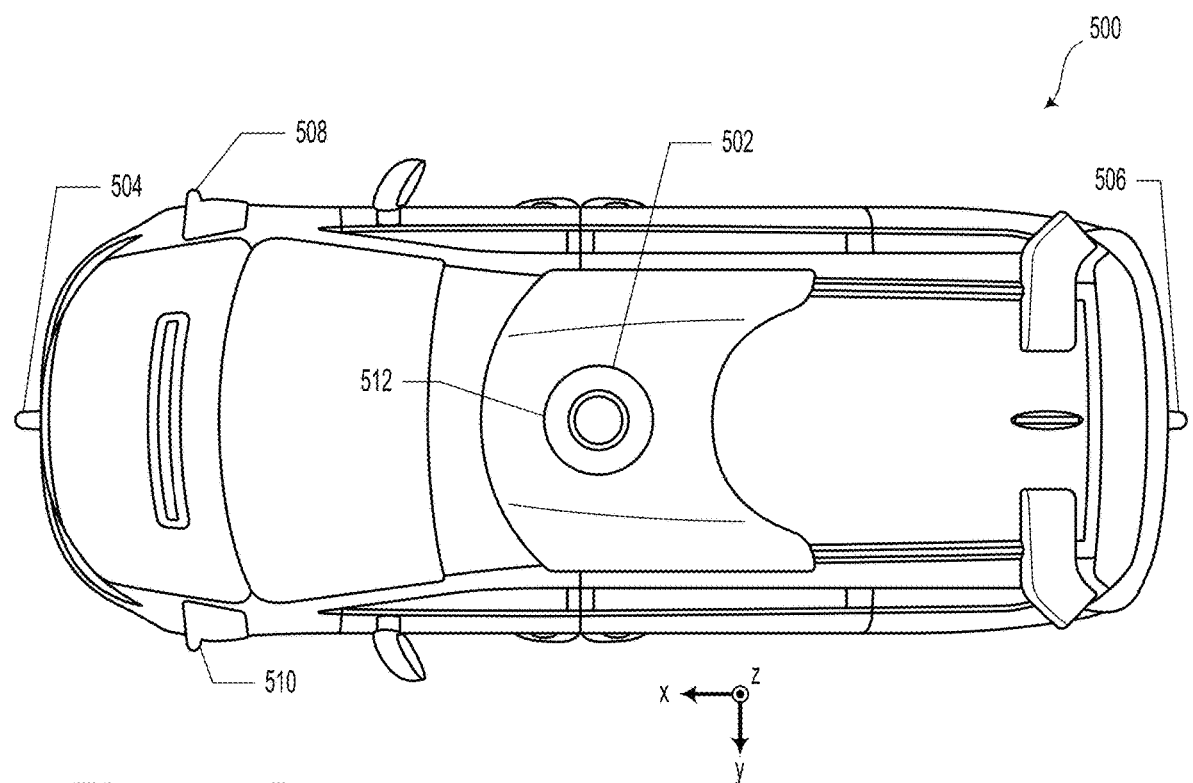
FIG. 5B illustrates a vehicle, according to an example embodiment.
Figure 5C:
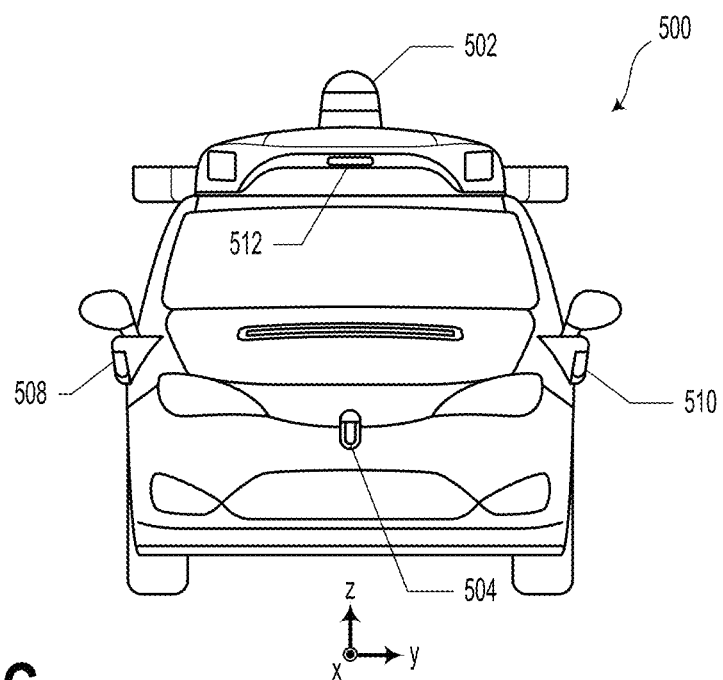
FIG. 5C illustrates a vehicle, according to an example embodiment.
Figure 5D:
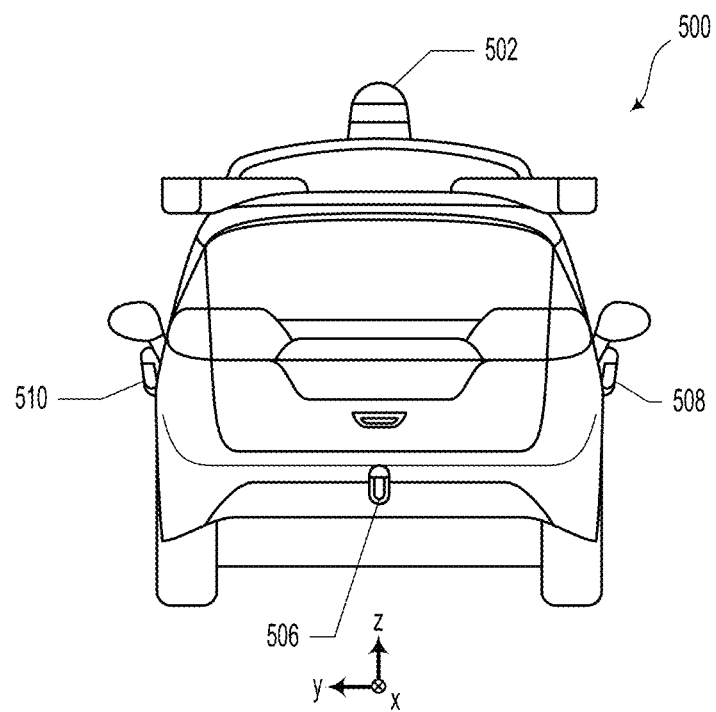
FIG. 5D illustrates a vehicle, according to an example embodiment.
Figure 5E:
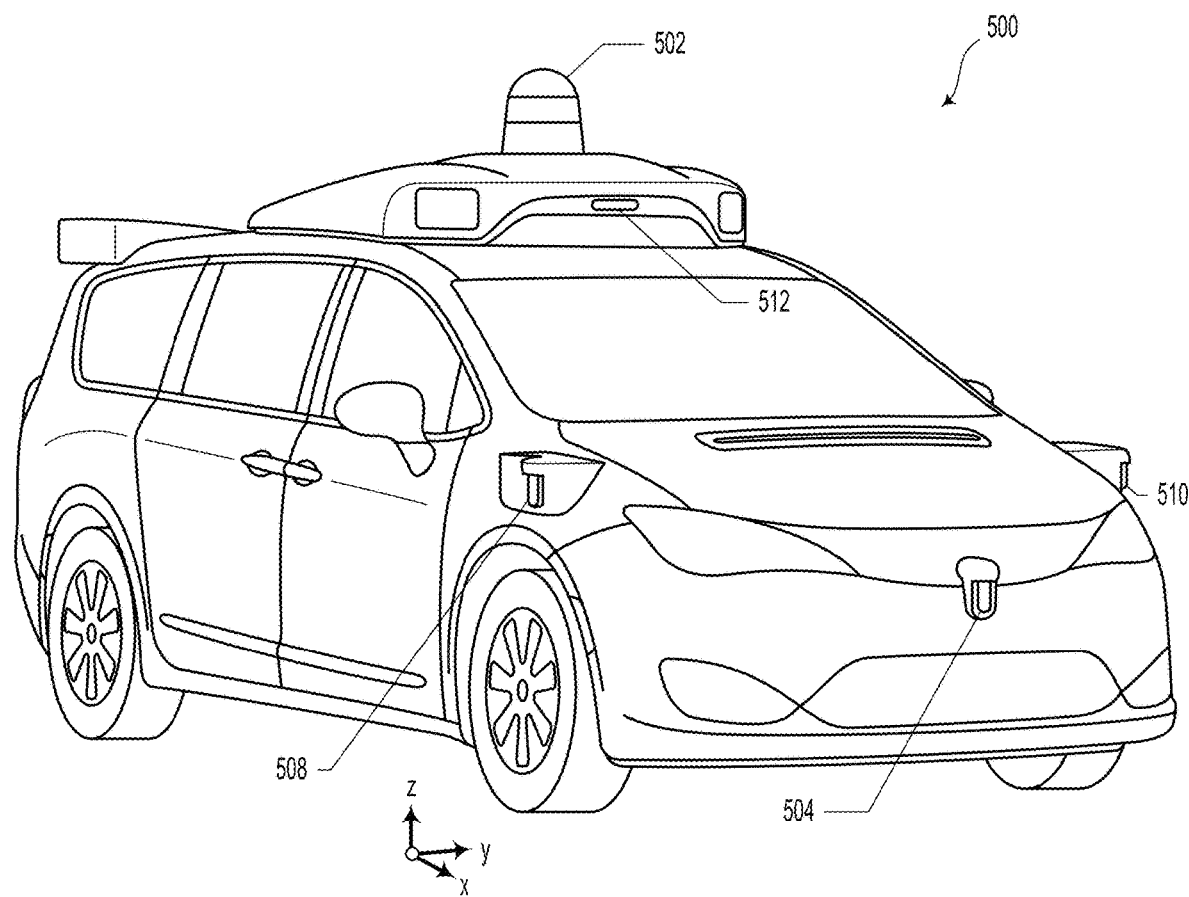
FIG. 5E illustrates a vehicle, according to an example embodiment.

FIG. 4I illustrates a graph 480 representing a normalized number of crosstalk returns versus time, according to an example embodiment. The graph 480 illustrates the number of normalized crosstalk returns with a fouled or dirty optical window. In comparison to graph 470, graph 480 illustrates a much higher number of normalized crosstalk returns due to the dirty optical window.

FIGS. 5A, 5B, 5C, 5D, and 5E illustrate a vehicle 500, according to an example embodiment. In some embodiments, the vehicle 500 could be a semi- or fully-autonomous vehicle. While FIGS. 5A, 5B, 5C, 5D, and 5E illustrates vehicle 500 as being an automobile (e.g., a passenger van), it will be understood that vehicle 500 could include another type of semi- or fully-autonomous vehicle that is capable of being operated in a self-driving mode (without a human input or with a reduced human input) to navigate within its environment (e.g. environment 10) using sensors and other information about its environment.

In some examples, the vehicle 500 may include one or more sensor systems 502, 504, 506, 508, 510, and 512. In some embodiments, sensor systems 502, 504, 506, 508, 510 and/or 512 could represent one or more lidar systems 100 as illustrated and described in relation to FIG. 1. In other words, lidar systems described elsewhere herein could be coupled to the vehicle 500 and/or could be utilized in conjunction with various operations of the vehicle 500. As an example, the lidar system 100 could be utilized in self-driving or other types of navigation, planning, perception, and/or mapping operations of the vehicle 500.

In some examples, the one or more devices or systems could be disposed in various locations on the vehicle 500 and could have fields of view that correspond to an environment that is internal and/or external to the vehicle 500.

While the one or more sensor systems 502, 504, 506, 508, 510, and 512 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

The one or more sensor systems 502, 504, 506, 508, 510, and/or 512 could include other lidar sensors. For example, the other lidar sensors could include a plurality of light-emitter devices arranged over a range of angles with respect to a given plane (e.g., the x-y plane). For example, one or more of the sensor systems 502, 504, 506, 508, 510, and/or 512 may be configured to rotate or pivot about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment of the vehicle 500 may be determined.

In an example embodiment, sensor systems 502, 504, 506, 508, 510, and/or 512 may be configured to provide respective point cloud information that may relate to physical objects within the environment of the vehicle 500. While vehicle 500 and sensor systems 502, 504, 506, 508, 510, and 512 are illustrated as including certain features, it will be understood that other types of sensor systems are contemplated within the scope of the present disclosure.

While lidar systems with multiple light-emitter devices (e.g., a light-emitter device with multiple laser bars on a single laser die) are described and illustrated herein, lidar systems with single light-emitter devices are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment.

While FIGS. 5A-5E illustrate various lidar sensors attached to the vehicle 500, it will be understood that the vehicle 500 could incorporate other types of sensors.

The lidar system of vehicle 500 further includes a plurality of detectors (e.g., detectors 130).

The lidar system of vehicle 500 additionally includes a controller (e.g., controller 150) having at least one processor (e.g., processor(s) 152) and a memory (e.g., memory 154). The at least one processor executes instructions stored in the memory so as to perform operations. The operations may include any of the method steps or blocks described with regard to methods 600 and 700.

In some embodiments, the one or more sensor systems 502, 504, 506, 508, 510, and/or 512 could include image sensors. For example, vehicle 500 could include a camera that includes an image sensor configured to provide images of a field of view. In various examples, the image sensor may include a plurality of detector elements.

In such scenarios, the camera could be disposed within sensor system 502, 504, 506, 508, 510 and/or 512. The camera can be a photosensitive instrument, such as a still camera, a video camera, a thermal imaging camera, a stereo camera, a night vision camera, etc., that is configured to capture a plurality of images of the environment of the vehicle 500. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment of the vehicle 500. To this end, the camera may use one or more range detecting techniques. For example, the camera can provide range information by using a structured light technique in which the vehicle 500 illuminates an object in the environment of the vehicle 500 with a predetermined light pattern, such as a grid or checkerboard pattern and uses the camera to detect a reflection of the predetermined light pattern from environmental surroundings. Based on distortions in the reflected light pattern, the vehicle 500 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 500. Other mounting locations and viewing angles of the camera can also be used, either inside or outside the vehicle 500. Further, the camera can have associated optics operable to provide an adjustable field of view. Still further, the camera can be mounted to vehicle 500 with a movable mount to vary a pointing angle of the camera, such as via a pan/tilt mechanism.

Additionally or alternatively, the vehicle 500 and/or sensor system 502, 504, 506, 508, 510, and/or 512 could include one or more radar systems. The radar system(s) could be configured to emit radio waves to determine the range, angle, and/or relative velocity of objects within the environment of the vehicle 500. As an example, the radar system could include a transmitter configured to emit radio waves or micro waves and a receiver configured to receive information about how those radio waves or micro waves interact with the environment of the vehicle 500. In various embodiments, the radar system could be configured to operate in pulsed and/or continuous mode.

In some embodiments, the vehicle 500 and/or sensor systems 502, 504, 506, 508, 510, and/or 512 could include other types of sensors such as one or more range finders, one or more inertial sensors, one or more humidity sensors, one or more acoustic sensors (e.g., microphones, sonar devices, etc.), and/or one or more other sensors configured to sense information about the environment of the vehicle 500. Any sensor system described elsewhere herein could be coupled to the vehicle 500 and/or could be utilized in conjunction with various operations of the vehicle 500. As an example, a lidar system could be utilized in self-driving or other types of navigation, planning, perception, and/or mapping operations of the vehicle 500. Yet further, one or more sensor types could be utilized in combination with one another (e.g., lidar and radar, lidar and camera, camera and radar, etc.).

Although not shown in FIGS. 5A-5E, the vehicle 500 can include a wireless communication system. The wireless communication system may include wireless transmitters and receivers that could be configured to communicate with devices external or internal to the vehicle 500. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

Figure 6:
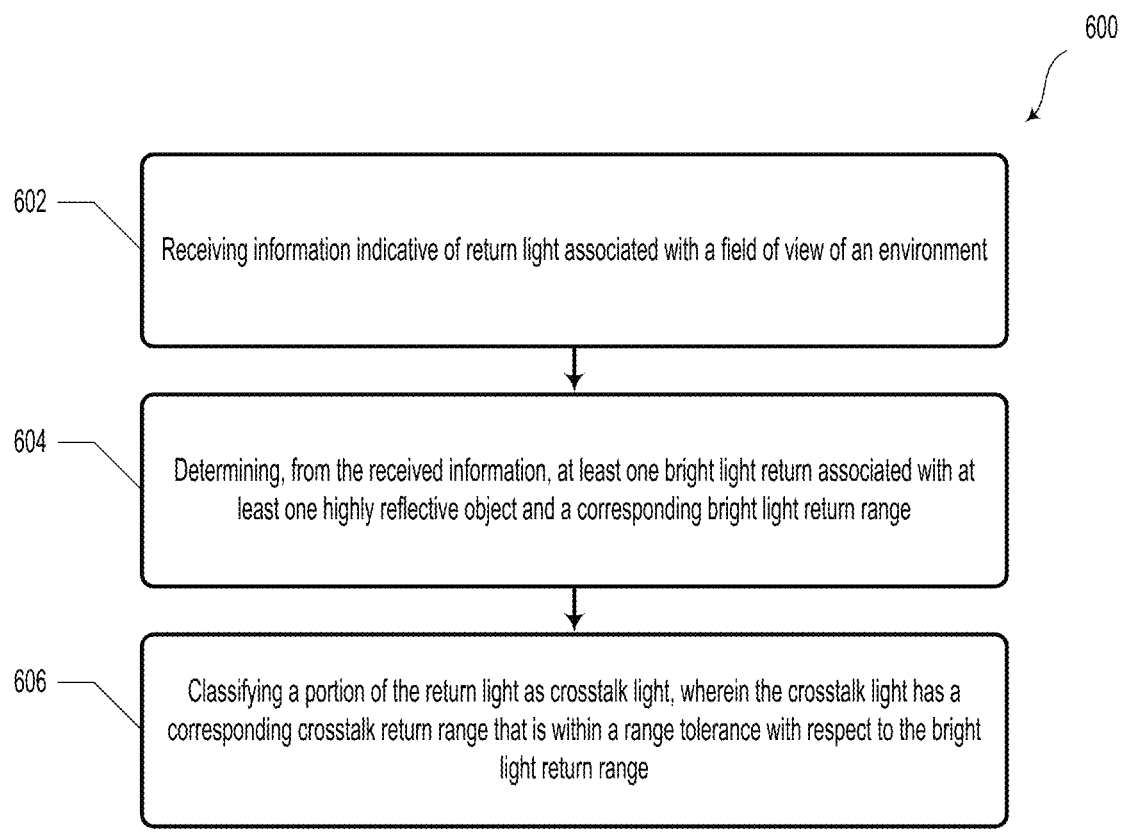
FIG. 6 illustrates a method, according to an example embodiment.

FIG. 6 illustrates a method 600, according to an example embodiment. While method 600 illustrates several blocks of a method, it will be understood that fewer or more blocks or steps could be included. In such scenarios, at least some of the various blocks or steps may be carried out in a different order than of that presented herein. Furthermore, blocks or steps may be added, subtracted, transposed, and/or repeated. Some or all of the blocks or steps of method 600 may be carried out so as to operate the lidar system 100 and/or vehicle 500, as illustrated and described in reference to FIG. 1 and FIG. 5, respectively.

Block 602 includes receiving information indicative of return light (e.g., return light 120) associated with a field of view (e.g., field of view 12) of an environment (e.g., environment 10). In some embodiments, the information indicative of the return light could be received by a controller (e.g., controller 150).

Block 604 includes determining, from the received information, at least one bright light return (e.g., bright light return(s) 122) associated with at least one highly reflective object (e.g., highly reflective object(s) 16) and a corresponding bright light return range (e.g., bright light return range 123).

Block 606 includes classifying a portion of the return light as crosstalk light (e.g., total number of crosstalk returns 158). In such scenarios, each crosstalk return of the total number of crosstalk returns 158 could include return light having a corresponding (e.g., similar) crosstalk return range (e.g., crosstalk return range 125). In various examples, the crosstalk return range can be within a range tolerance (e.g., range tolerance 159) with respect to the bright light return range.

In some embodiments, method 600 could also include causing at least one light-emitter device (e.g., light-emitter device(s) 110) to emit emitted light pulses (e.g., light pulses 112) into the environment. In such scenarios, the return light could include at least a portion of the emitted light pulses that have interacted with objects (e.g., objects 14) in the environment.

In example embodiments, method 600 can also include determining a normalized number of crosstalk returns (e.g., normalized number of crosstalk returns 158) based on an apparent size of the at least one highly reflective object in the field of view.

In various examples, method 600 could also include adjusting, based on the normalized number of crosstalk returns, at least one of: a cleaning system (e.g., cleaning system 160), an operating mode of a lidar system (e.g., lidar system 100), or an operating mode of a vehicle (e.g., vehicle 500). For example, adjusting a cleaning system could include turning on a wiper/fluid jet cleaning system or a compressed gas cleaning system. Additionally or alternatively, adjusting an operating mode of the lidar system could include changing a spatial resolution of the lidar system, changing a temporal resolution of the lidar system, and/or changing a maximum range of the lidar system, among other possibilities. In various embodiments, adjusting an operating mode of the vehicle could include changing a maximum speed of the vehicle, adjusting a route of the vehicle, and/or scheduling a vehicle repair or sensor cleaning appointment, among other possibilities.

In some embodiments, determining the at least one bright light return could include comparing an amplitude of the return light to a photon threshold (e.g., photon threshold 156). In such scenarios, the at least one bright light return is determined where the amplitude (e.g., as measured by the number of received photons) of the return light is greater than the photon threshold.

In example embodiments, the range tolerance could be within 50 centimeters of the bright light return range. Additionally or alternatively, the range tolerance could be between −30 centimeters and +50 centimeters with respect to the bright light return range.

Figure 7:
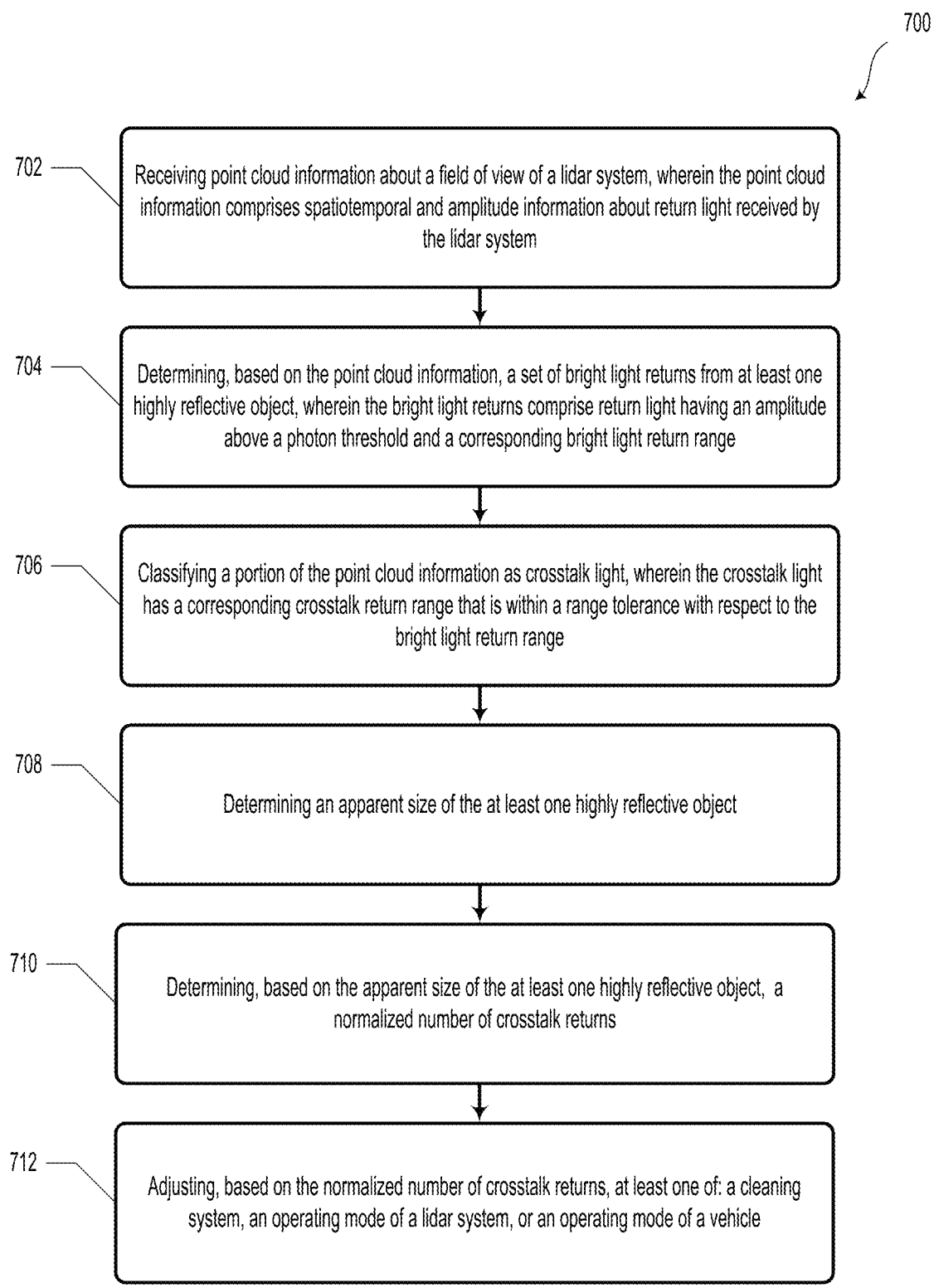
FIG. 7 illustrates a method, according to an example embodiment.

FIG. 7 illustrates a method 700, according to an example embodiment. While method 700 illustrates several blocks of a method, it will be understood that fewer or more blocks or steps could be included. In such scenarios, at least some of the various blocks or steps may be carried out in a different order than of that presented herein. Furthermore, blocks or steps may be added, subtracted, transposed, and/or repeated. Some or all of the blocks or steps of method 700 may be carried out so as to operate the lidar system 100 and/or vehicle 500, as illustrated and described in reference to FIG. 1 and FIG. 5, respectively.

Block 702 includes receiving point cloud information about a field of view (e.g., field of view 12) of a lidar system (e.g., lidar system 100). In such scenarios, the point cloud information could include spatiotemporal and amplitude information about return light (e.g., return light 120) received by the lidar system.

Block 704 includes determining, based on the point cloud information, a set of bright light returns (e.g., bright light returns 122) from at least one highly reflective object (highly reflective object 16). In such scenarios, the bright light returns could include return light having an amplitude above a photon threshold (e.g., photon threshold 156) and a corresponding bright light return range (e.g., bright light return range 123). In some examples, the bright light return range 123 could include a distance of between 0.1 meter to 200 meters from the lidar system 100.

Block 706 includes classifying a portion of the point cloud information as crosstalk light (e.g., crosstalk returns 124). In such scenarios, the crosstalk returns could include the portion of return light that has a corresponding crosstalk return range (e.g., crosstalk return range 125). In example embodiments, the crosstalk return range could be within a range tolerance (e.g., range tolerance 159) with respect to the bright light return range.

In alternative embodiments, classifying the portion of the point cloud information as crosstalk light could be performed based on incoming return light from a similar angle or region from the bright light returns.

In some embodiments, the range tolerance could be within 50 centimeters of the bright light return range. In other examples, the range tolerance could be between −30 centimeters and +50 centimeters with respect to the bright light return range.

Block 708 includes determining an apparent size of the at least one highly reflective object. The apparent size of the highly reflective object could be determined by various methods including, but not limited to, object recognition in a captured camera image, radar data, or lidar data.

Block 710 includes determining, based on the apparent size of the at least one highly reflective object, a normalized number of crosstalk returns (e.g., normalized number of crosstalk returns 158).

Block 712 includes adjusting, based on the normalized number of crosstalk returns, at least one of: a cleaning system (e.g., cleaning system 160), an operating mode of a lidar system (e.g., lidar system 100), or an operating mode of a vehicle (e.g., vehicle 500).

In some examples, the method 700 could include annotating lidar data to indicate at least a portion of the lidar data as "fouled". In such scenarios, annotating lidar data as being fouled could provide an indication or cue to other modules that utilize lidar point cloud data downstream. As an example, lidar data marked as fouled could be ignored by a machine learning model to avoid the use of training data based on hazy, blurry, or otherwise fouled images. Additionally or alternatively, the crosstalk return information could be used to flag potentially problematic hardware (e.g., bad window coatings, etc.) for maintenance or servicing of components.

In various examples, method 700 may additionally include adjusting a position or an orientation of the lidar system so as to operate with respect to a second field of view. In such scenarios, method 700 could include carrying out the other method steps (e.g., blocks 702, 704, 706, 708, 710, and 712, etc.) for the second field of view.

Figure 8:
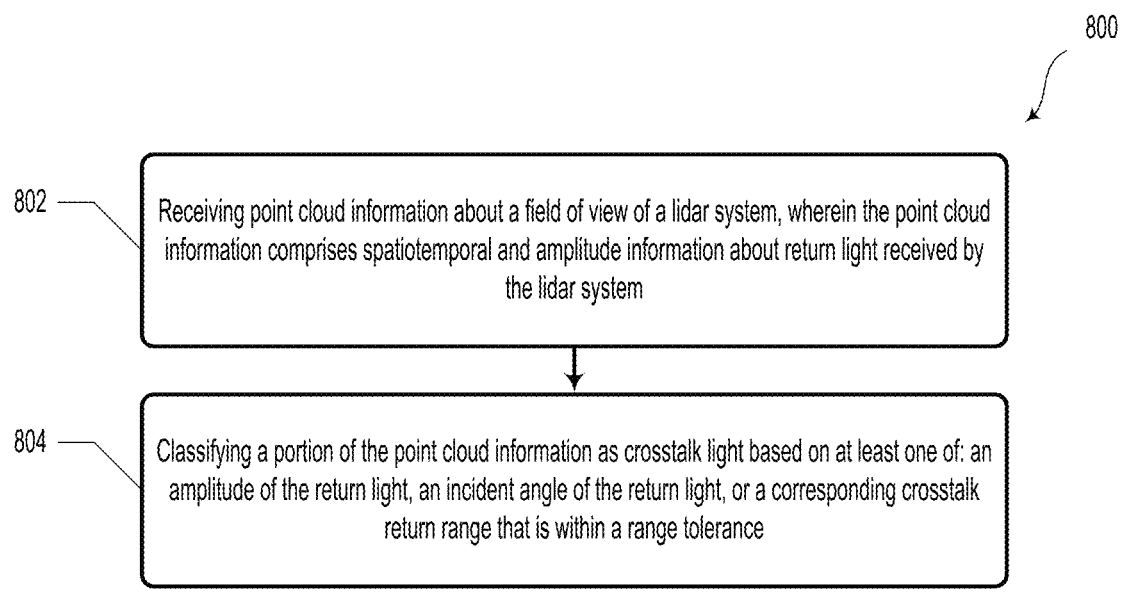
FIG. 8 illustrates a method, according to an example embodiment.

FIG. 8 illustrates a method 800, according to an example embodiment. While method 800 illustrates several blocks of a method, it will be understood that fewer or more blocks or steps could be included. In such scenarios, at least some of the various blocks or steps may be carried out in a different order than of that presented herein. Furthermore, blocks or steps may be added, subtracted, transposed, and/or repeated. Some or all of the blocks or steps of method 800 may be carried out so as to operate the lidar system 100 and/or vehicle 500, as illustrated and described in reference to FIG. 1 and FIG. 5, respectively.

Block 802 includes receiving point cloud information about a field of view (e.g., field of view 12) of a lidar system (e.g., lidar system 100). The point cloud information includes spatiotemporal and amplitude information about return light (e.g., return light 120) received by the lidar system.

Block 804 includes classifying a portion of the point cloud information as crosstalk light based on at least one of: an amplitude of the return light, an incident angle of the return light, or a corresponding crosstalk return range that is within a range tolerance.

In some embodiments, method 800 could include annotating the crosstalk light portion of the point cloud information as being fouled. In such a scenario, the method 800 could also include providing the annotated point cloud information to a downstream module.

Additionally or alternatively, method 800 can include determining, based on the crosstalk light, a hardware issue. Hardware issues could include, without limitation, a cracked optical element, a degraded optical coating, and/or an obscured optical window (e.g., due to rain, snow, dust, mud, etc.) In such a scenario, the method 800 could include, in response to determining the hardware issue, scheduling a maintenance visit or navigating to a maintenance facility. That is, if crosstalk light rises above a predetermined threshold, it may indicate an obscured optical window, among other hardware issues. In response, a controller (e.g., controller 150) could route the vehicle toward a maintenance facility to get a repair on the optical element. It will be understood that other actions may be taken in response to determining a hardware issue.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A light detection and ranging (lidar) system comprising:
- at least one light-emitter device configured to emit light pulses into a field of view of an environment;
- at least one detector; and
- a controller comprising at least one processor and a memory, wherein the at least one processor executes instructions stored in the memory so as to perform operations, the operations comprising:
  - causing the at least one light-emitter device to emit at least one light pulse into the field of view;
  - receiving, from the at least one detector, information indicative of return light associated with the field of view;
  - determining, based on the received information, at least one bright light return associated with at least one highly reflective object and a corresponding bright light return range; and
  - classifying a portion of the return light as crosstalk light, wherein the crosstalk light has a corresponding crosstalk return range that is within a range tolerance with respect to the bright light return range.

2. The lidar system of claim 1, wherein the operations further comprise
- determining a normalized number of crosstalk returns based on an apparent size of the at least one highly reflective object in the field of view.

3. The lidar system of claim 2, further comprising:
- at least one optical surface; and
- a cleaning system, wherein the operations additionally include:
  - causing, based on the normalized number of crosstalk returns, the cleaning system to clean the at least one optical surface.

4. The lidar system of claim 3, wherein the at least one optical surface comprises: an optical window, an optical lens, or a reflective surface.

5. The lidar system of claim 3, wherein the cleaning system comprises at least one of: a compressed gas jet, a fluid jet, or a mechanical wiper.

6. The lidar system of claim 1, wherein the range tolerance is within 50 centimeters of the bright light return range.

7. The lidar system of claim 1, wherein the range tolerance is between −30 centimeters and +50 centimeters with respect to the bright light return range.

8. The lidar system of claim 1, wherein the bright light return range comprises a distance of between 0.1 meter to 200 meters.

9. A method comprising:
- receiving information indicative of return light associated with a field of view of an environment;
- determining, from the received information, at least one bright light return associated with at least one highly reflective object and a corresponding bright light return range; and
- classifying a portion of the return light as crosstalk light, wherein the crosstalk light has a corresponding crosstalk return range that is within a range tolerance with respect to the bright light return range.

10. The method of claim 9, further comprising:
- causing at least one light-emitter device to emit emitted light pulses into the environment, wherein the return light comprises at least a portion of the emitted light pulses that have interacted with objects in the environment.

11. The method of claim 10, further comprising:
- determining a normalized number of crosstalk returns based on an apparent size of the at least one highly reflective object in the field of view.

12. The method of claim 11, further comprising:
- adjusting, based on the normalized number of crosstalk returns, at least one of: a cleaning system, an operating mode of a lidar system, or an operating mode of a vehicle.

13. The method of claim 9, wherein determining the at least one bright light return comprises:
- comparing an amplitude of the return light to a photon threshold, and wherein the at least one bright light return is determined where the amplitude of the return light is greater than the photon threshold.

14. The method of claim 9, wherein the range tolerance is within 50 centimeters of the bright light return range.

15. The method of claim 9, wherein the range tolerance is between −30 centimeters and +50 centimeters with respect to the bright light return range.

16. A method comprising:
- receiving point cloud information about a field of view of a lidar system, wherein the point cloud information comprises spatiotemporal and amplitude information about return light received by the lidar system;
- determining, based on the point cloud information, a set of bright light returns from at least one highly reflective object, wherein the bright light returns comprise return light having an amplitude above a photon threshold and a corresponding bright light return range;
- classifying a portion of the point cloud information as crosstalk light, wherein the crosstalk light has a corresponding crosstalk return range that is within a range tolerance with respect to the bright light return range;
- determining an apparent size of the at least one highly reflective object;
- determining, based on the apparent size of the at least one highly reflective object, a normalized number of crosstalk returns; and
- adjusting, based on the normalized number of crosstalk returns, at least one of: a cleaning system, an operating mode of a lidar system, or an operating mode of a vehicle.

17. The method of claim 16, wherein the range tolerance is within 50 centimeters of the bright light return range.

18. The method of claim 16, wherein the range tolerance is between −30 centimeters and +50 centimeters with respect to the bright light return range.

19. The method of claim 16, wherein the bright light return range comprises a distance of between 0.1 meter to 200 meters.

20. The method of claim 16, further comprising:
- adjusting a position or an orientation of the lidar system so as to operate with respect to a second field of view; and
- carrying out the other method steps for the second field of view.

* * * * *